US011083043B2

United States Patent
Sugawara et al.

(10) Patent No.: US 11,083,043 B2
(45) Date of Patent: Aug. 3, 2021

(54) METHOD AND SYSTEM FOR USER EQUIPMENT (UE) REGISTRATION

(71) Applicants: SHARP KABUSHIKI KAISHA, Sakai (JP); FG INNOVATION COMPANY LIMITED, Tuen Mun (HK)

(72) Inventors: Yasuo Sugawara, Sakai (JP); Masafumi Aramoto, Sakai (JP)

(73) Assignees: FG Innovation Company Limited, Hong Kong (HK); Sharp Kabushiki Kaisha, Osaka (JP)

( * ) Notice: Subject to any disclaimer, the term of this patent is extended or adjusted under 35 U.S.C. 154(b) by 19 days.

(21) Appl. No.: 16/612,310

(22) PCT Filed: May 9, 2018

(86) PCT No.: PCT/JP2018/017974
§ 371 (c)(1),
(2) Date: Nov. 8, 2019

(87) PCT Pub. No.: WO2018/207837
PCT Pub. Date: Nov. 15, 2018

(65) Prior Publication Data
US 2020/0120751 A1 Apr. 16, 2020

(30) Foreign Application Priority Data
May 9, 2017 (JP) .............................. JP2017-092901

(51) Int. Cl.
*H04W 60/00* (2009.01)
*H04W 80/10* (2009.01)
(Continued)

(52) U.S. Cl.
CPC ............ *H04W 80/10* (2013.01); *H04W 8/08* (2013.01); *H04W 48/16* (2013.01); *H04W 48/18* (2013.01); *H04W 60/00* (2013.01); *H04W 76/12* (2018.02)

(58) Field of Classification Search
CPC ..... H04W 48/18; H04W 48/16; H04W 76/12; H04W 8/08; H04W 84/042; H04W 60/04;
(Continued)

(56) References Cited

U.S. PATENT DOCUMENTS

2018/0227873 A1* 8/2018 Vrzic .................... H04W 76/27
2019/0174449 A1   6/2019 Shan et al.
2019/0182788 A1* 6/2019 Lee ....................... H04W 60/00

OTHER PUBLICATIONS

3rd Generation Partnership Project; Technical Specification Group Services and System Aspects; System Architecture for the 5G System; Stage 2 (Release 15); 3GPP TS 23.501 v0.4.0 (Apr. 2017).
(Continued)

*Primary Examiner* — Daniel Lai
(74) *Attorney, Agent, or Firm* — Imperium Patent Works

(57) ABSTRACT

A User Equipment (UE) transmits a registration request message to an AMF in a registration procedure to a core network, the registration request message including information indicating a request for transmission of LADN information, receives the LADN information from the AMF, performs a PDU session establishment procedure initiated by the UE to establish a first PDU session with a DN different from the LADN, and performs the PDU session establishment procedure initiated by a network to establish a second PDU session with the LADN in a case that the UE moves to an area connectable to the LADN. This provides a control method that should be performed by each apparatus constituting a 5GS for the UE to establish the session to the LADN, and a control method for allowing only the UE
(Continued)

connectable to the LADN to establish the session to the LADN.

8 Claims, 14 Drawing Sheets

(51) Int. Cl.
*H04W 76/12* (2018.01)
*H04W 8/08* (2009.01)
*H04W 48/16* (2009.01)
*H04W 48/18* (2009.01)

(58) Field of Classification Search
CPC . H04W 76/10; H04W 76/27; H04W 28/0268; H04W 76/11; H04W 36/14; H04W 60/00; H04W 80/10; H04W 28/24; H04W 36/00; H04W 36/0022; H04W 76/25; H04W 88/14; H04W 8/18; H04W 48/04; H04W 76/19; H04W 8/02; H04W 76/30; H04W 8/06; H04W 24/02; H04W 24/04; H04W 28/0226; H04W 36/0011; H04W 36/32; H04W 40/246; H04W 8/04; H04W 28/0247; H04W 4/021; H04W 4/50; H04W 60/02; H04W 64/00; H04W 64/003; H04W 74/002
See application file for complete search history.

(56) References Cited

OTHER PUBLICATIONS

3rd Generation Partnership Project; Technical Specification Group Services and System Aspects; Procedures for the 5G System; Stage 2 (Release 15); 3GPP TS 23.502 v0.3.0 (Mar. 2017).
3GPP TS 23.501 V0.4.0 (Apr. 20, 2017) pp. 42-43, 48.
3GPP TR 23.799 V14.0.0 (Dec. 16, 2016) pp. 278-279.
Samsung, "Location Area Reporting Service", S2-172141, SA WG2 Meeting #120 Mar. 27-31, 2017 p. 1.
3GPP TS 23.502 V0.3.0 (Mar. 2017) pp. 9-13.
Qualcomm Incorporated et al., "TS 23.501—Additional concepts and corrections for support for connectivity to a local area network", S2-171715, SA WG2 #S2-120, Mar. 27-31, 2017 pp. 1-6.
Samsung: "TS 23.502—Update 4.2.2.2 General Registration", 3GPP Draft; S2-173269 TS23.502 P-CR to Update Registration Procedure for LADN, 3rd Generation Partnership Project (3GPP), Mobile Competence Centre; 650, Route Des Lucioles; F-06921 Sophia-Antipolis Cedex, France; SA WG2, Hangzhou, China; May 15, 2017-May 19, 2017 May 8, 2017 (May 8, 2017), XP0S1268419, Retrieved from the Internet: URL:http://www.3gpp.org/ftp/tsg_sa/WG2_Arch/TSGS2_121_Hangzhou/Docs/.
Huawei et al. "Discussion on aspects for LADN", 3GPP Draft; S2-182275—Discussion on Aspects for LADN, 3rd Generation Partnership Project (3GPP), Mobile Competence Centre ; 650, Route Des Lucioles ; F-06921 Sophia-Antipolis Cedex ; France, vol. SA WG2, No. Montreal, Canada; Feb. 26, 2018-Mar. 2, 2018, Feb. 20, 2018 (Feb. 20, 2018), XP051408794, Retrieved from the Internet: URL:http://www.3gpp.org/ftp/tsg_sa/WG2_Arch/TSGS2_126_Montreal/Docs/, [retrieved on Feb. 20, 2018].
Huawei et al. "Correction on aspects for LADN", 3GPP Draft; S2-182276—Correction on Aspects for LADN, 3rd Generation Partnership Project (3GPP), Mobile Competence Centre ; 650, Route Des Lucioles ; F-06921 Sophia-Antipolis Cedex ; France, vol. SA WG2, No. Montreal, Canada; Feb. 26, 2018-Mar. 2, 2018, Feb. 20, 2018 (Feb. 20, 2018), XP051408795, Retrieved from the Internet: URL:http://www.3gpp.org/ftp/tsg_sa/WG2_Arch/TSGS2_126_Montreal/Docs/, [retrieved on Feb. 20, 2018].
"3rd Generation Generation Partnership Project; Technical Specification Group Services and System Aspects; System Architecture for the 5G System; Stage 2 (Release 15)", 3GPP Standard; Technical Specification; 3GPP TS 23.501, 3rd Generation Partnership Project (3GPP), Mobile Competence Centre; 650, Route Des Lucioles; F-06921 Sophia-Antipolis Cedex; France; vol. SA WG2, No. V15.2.0, Jun. 19, 2018 (Jun. 19, 2018), pp. 1-217, XP051472860, [retrieved on Jun. 19, 2018].

* cited by examiner

METHOD AND SYSTEM FOR USER EQUIPMENT (UE) REGISTRATION

TECHNICAL FIELD

The present invention relates to a User Equipment (UE). This application claims priority based on JP 2017-92901 filed on May 9, 2017 in Japan, the contents of which are incorporated herein in its entirety by reference.

BACKGROUND ART

The 3rd Generation Partnership Project (3GPP), which undertakes activities for standardizing recent mobile communication systems, discusses System Architecture Evolution (SAE), which is the system architecture of Long Term Evolution (LTE). The 3GPP is in a process of standardizing Evolved Packet System (EPS) as a communication system for achieving an all-Internet Protocol (IP) architecture. Note that a core network constituting the EPS is called an Evolved Packet Core (EPC).

Additionally, the 3GPP recently has been studying a next-generation communication technology and a system architecture for 5th Generation (5G) mobile communication system which is a next-generation mobile communication system.

Especially, as a system for achieving the 5G mobile communication system, the 3GPP is in a process of standardizing 5G System (5GS) (see NPL 1 and NPL 2). In the 5GS, technical problems for connecting various terminals to a cellular network are identified for standardization to address the technical problems.

For example, requirement conditions include optimization and diversification of a communication procedure for supporting a continual mobile communication service depending on a terminal supporting various access networks, optimization of a system architecture suitable for the optimization and diversification of the communication procedure, and the like.

CITATION LIST

Non Patent Literature

NPL 1: 3GPP TS 23.501 v0.4.0; 3rd Generation Partnership Project; Technical Specification Group Services and System Aspects; System Architecture for the 5G System; Stage 2 (Release 15)

NPL 2: 3GPP TS 23.502 v0.3.0; 3rd Generation Partnership Project; Technical Specification Group Services and System Aspects; Procedures for the 5G System; Stage 2 (Release 15)

SUMMARY OF INVENTION

Technical Problem

In the 5GS, in addition to a general Data Network (DN) equivalent to a Packet Data Network (PDN) in the 4G, a Local Area Data Network (LADN), which is a DN to which a User Equipment (UE) is connectable only at a specific location, has also been studied (see NPL 1 and NPL 2). However, a control method, performed by each apparatus constituting the 5GS, for allowing the UE to establish a PDU session to the LADN, which is the special DN in this manner, has not yet been standardized. Additionally, it is unclear whether all UEs may establish the PDU session to the LADN or can establish the PDU session to the LADN.

In light of the foregoing, an object of the present invention is to provide a control method to be performed by each apparatus constituting the 5GS for allowing the UE to establish the PDU session to the LADN, and the UE and the like for allowing only a UE connectable to the LADN to establish the PDU session to the LADN.

Solution to Problem

A User Equipment (UE) according to the present invention transmits a registration request message to an AMF in a registration procedure to a core network, the registration request message including information indicating a request for transmission of Local Area Data Network (LADN) information; receives the LADN information from the AMF, performs a PDU session establishment procedure initiated by the UE to establish a first PDU session with a DN different from the LADN, and performs the PDU session establishment procedure initiated by a network to establish a second PDU session with the LADN in a case that the UE moves to an area connectable to the LADN.

Additionally, the UE according to the present invention transmits a first Router Solicitation (RS) in the PDU session establishment procedure to establish the first PDU session, and receives a first Router Advertisement (RA) from an apparatus that has received the RS, the first RA including information indicating a preference to the DN different from the LADN.

Additionally, the UE according to the present invention transmits a second Router Solicitation (RS) in the PDU session establishment procedure to establish the second PDU session, and receives a second Router Advertisement (RA) from an apparatus that has received the RS, the second RA including information indicating a preference to the LADN.

Additionally, the UE according to the present invention compares a value of the information indicating the preference to the LADN with a value of information indicating the preference to the DN different from the LADN, maintains a PDU session to the LADN and releases a PDU session to the DN different from the LADN in a case that the value of the information indicating the preference to the LADN is higher than the value of the information indicating the preference to the DN different from the LADN, and maintains the PDU session to the DN different from the LADN and releases the PDU session to the LADN in a case that the value of the information indicating the preference to the LADN is lower than the value of the information indicating the preference to the DN different from the LADN.

Additionally, the UE according to the present invention compares a value of the information indicating the preference to the LADN with a value of information indicating a preference to the DN different from the LADN, and constantly maintains a PDU session to the LADN and releases a PDU session to the DN different from the LADN in a case that the value of the information indicating the preference to the LADN is identical to the value of the information indicating the preference to the DN different from the LADN.

Additionally, the UE according to the present invention compares a value of the information indicating the preference to the LADN with a value of information indicating a preference to the DN different from the LADN, and constantly maintains the PDU session to the DN different from the LADN and releases the PDU session to the LADN in a case that the value of the information indicating the preference to the LADN is identical to the value of the information indicating the preference to the DN different from the LADN.

Advantageous Effects of Invention

According to the present invention, among the UEs constituting the 5GS, only the UE having the capability of being connectable to the LADN can acquire the LADN information. In addition, the UE that has acquired the LADN information can establish connectivity (session) to the LADN only at a specific location where the connection to the LADN is allowed.

DESCRIPTION OF EMBODIMENTS

A preferred embodiment for carrying out the present invention will be described below with reference to the drawings. Note that as an example, the present embodiment describes an embodiment of a mobile communication system to which the present invention is applied.

1. System Overview

Figure 1:
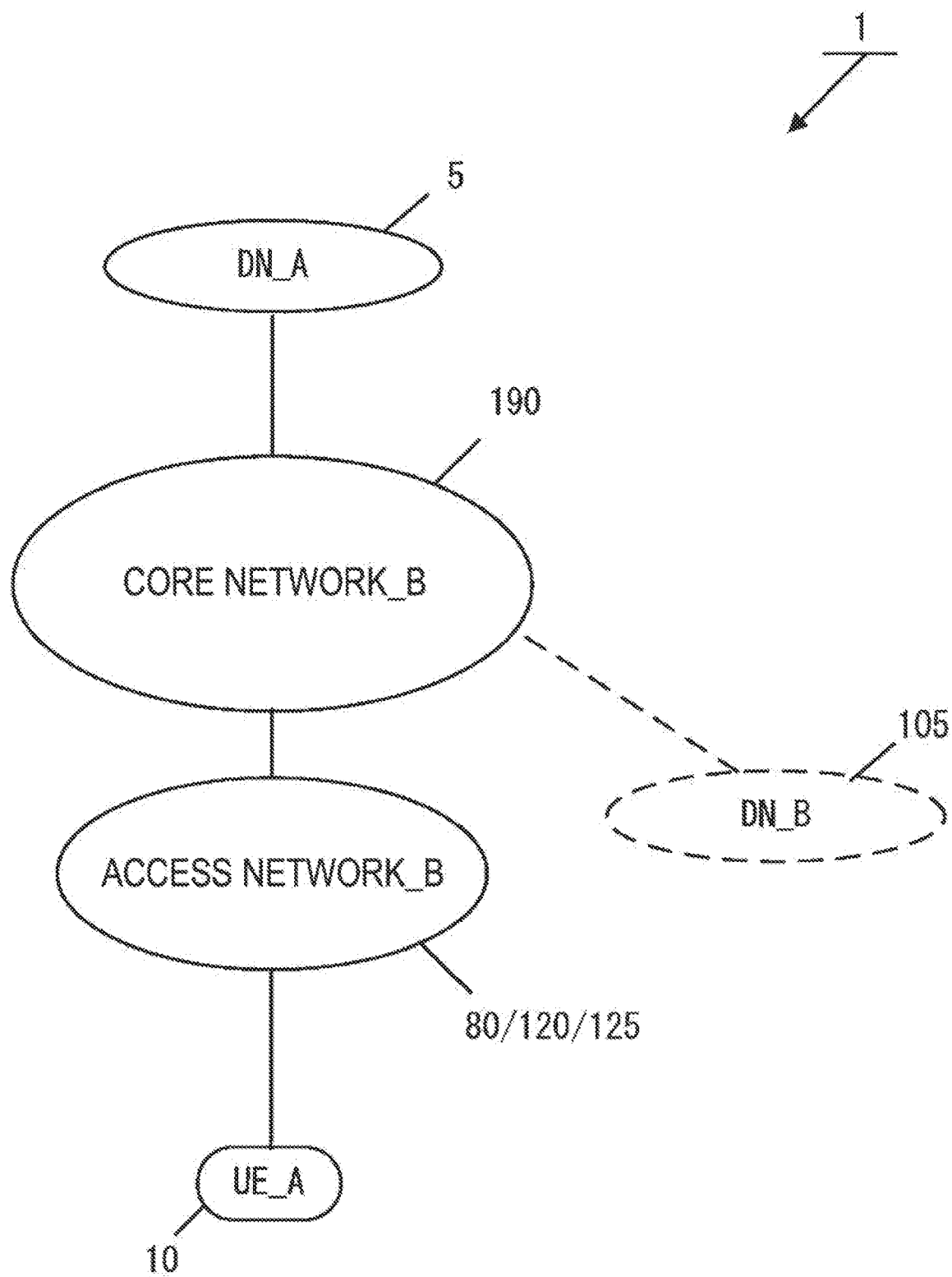
FIG. 1 is a diagram illustrating an overview of a mobile communication system.
Figure 2:
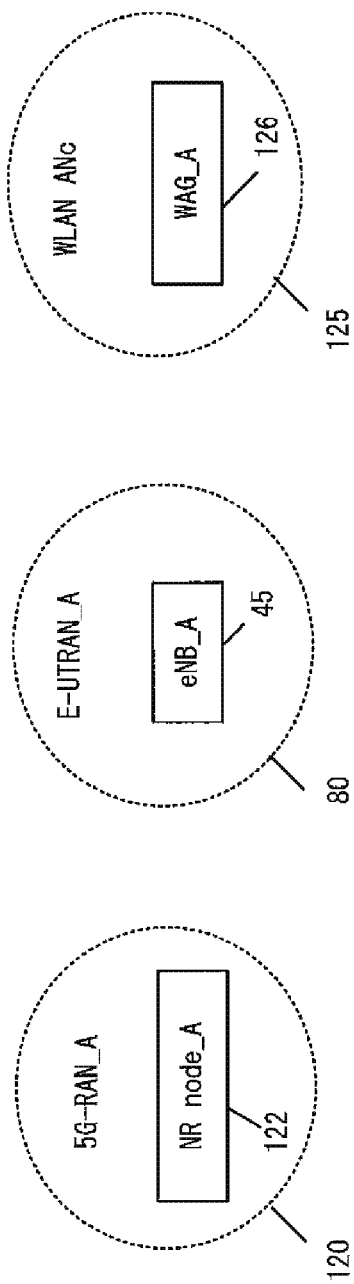
FIG. 2 is a diagram illustrating an example of a configuration or the like of an access network in the mobile communication system.
Figure 3:
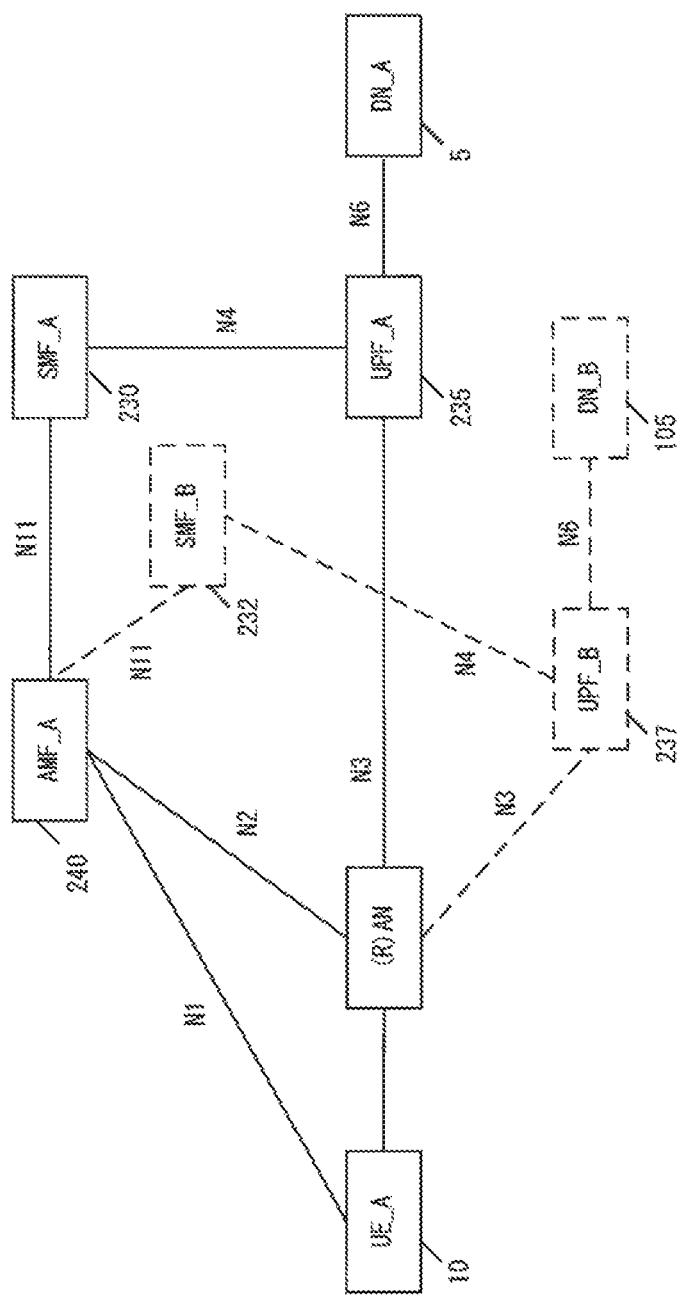
FIG. 3 is a diagram illustrating an example of a configuration or the like of a core network in the mobile communication system.

A schematic mobile communication system according to the present embodiment will be described with reference to FIG. 1, FIG. 2, and FIG. 3. FIG. 2 is a diagram illustrating details of an access network in the mobile communication system of FIG. 1. FIG. 3 is a diagram mainly illustrating details of a core network in the mobile communication system of FIG. 1. As illustrated in FIG. 1, a mobile communication system 1 (also referred to as a 5GS) according to the present embodiment includes a User Equipment (also referred to as a terminal apparatus and a mobile terminal apparatus) UE_A 10, an Access Network (AN)_B, a Core Network (CN)_B 190, and a Data Network (DN)_A 5 and a DN_B 105.

Here, a UE_A 10 may be equipment connectable to a network service via a 3GPP access (also referred to as a 3GPP access or a 3GPP access network) and/or non-3GPP access (also referred to as a non-3GPP access or a non-3GPP access network). The UE_A 10 may include a Universal Integrated Circuit Card (UICC) and an Embedded UICC (eUICC). The UE_A 10 may be a wirelessly connectable terminal equipment, and may be a Mobile Equipment (ME), a Mobile Station (MS), a Cellular Internet of Things (CIoT) terminal (CIoT UE), or the like.

The UE_A 10 is connectable to the access network and/or the core network. The UE_A 10 can connect to a DN_A 5 via the access network and/or the core network. The UE_A 10 transmits and/or receives (communicates) user data to and/or from the DN_A 5 by using a Protocol Data Unit or a Packet Data Unit (PDU) session. Furthermore, the communication of the user data are not limited to Internet Protocol (IP) communication, but may be non-IP communication.

Here, the IP communication is data communication using the IP, and are data communication achieved through transmitting and/or receiving IP packets to which IP headers are given. Note that a payload section constituting the IP packet may include the user data transmitted and/or received by the UE_A 10. The non-IP communication is data communication not using the IP, and is data communication achieved through transmitting and/or receiving data to which the IP headers are not given. For example, the non-IP communication may be the data communication achieved through transmitting and/or receiving application data not given the IP packet, or may transmit and/or receive the user data transmitted and/or received by the UE_A 10 to which another header such as a MAC header and an Ethernet (trade name) frame header is given.

Also, the PDU session is connectivity established between the UE_A 10 and the DN_A 5 and/or the DN_B 105 to provide a PDU connection service. To be more specific, the PDU session may be connectivity established between the UE_A 10 and an external gateway. Here, the external gateway may be a User Plane Function (UPF), a Packet Data Network Gateway (PGW), and the like. The PDU session may be a communication path established for transmitting and/or receiving the user data between the UE_A 10 and the core network and/or the DN (DN_A 5 and/or DN_B 105), or may be a communication path for transmitting and/or receiving the PDU. Furthermore, the PDU session may be a session established between the UE_A 10 and the core network and/or the DN (DN_A 5 and/or DN_B 105), or may be a logical communication path including a transfer path such as one or more bearers between the respective apparatuses in the mobile communication system 1. To be more specific, the PDU session may be a connection established by the UE_A 10 between a core network_B 190 and/or the external gateway, or may be a connection established between the UE_A 10 and a UPF (a UPF_A 235 and/or a UPF_B 237). Furthermore, the PDU session may be connectivity and/or a connection between the UE_A 10 and the UPF (the UPF_A 235 and/or the UPF_B 237) via an NR node_A 122. Furthermore, the PDU session may be identified by a PDU session ID and/or an EPS bearer ID.

Note that the UE_A 10 can transmit and/or receive the user data to and/or from an apparatus, such as an application server, that is located in the DN_A 5 and/or the DN_B 105 by using the PDU session. In other words, the PDU session can transfer the user data transmitted and/or received between the UE_A 10 and the apparatus, such as the application server, that is located in the DN_A 5 and/or the DN_B 105. Furthermore, each apparatus (the UE_A 10, the apparatus in the access network, and/or the apparatus in the core network) may correlate one or more pieces of identification information to the PDU session for management. Note that these pieces of identification information may include at least one of an Access Point Name (APN), a Traffic Flow Template (TFT), a session type, application identification information, identification information of the DN_A 5 and/or the DN_B 105, Network Slice Instance (NSI) identification information, Dedicated Core Network (DCN) identification information, or access network identification information, or may further include another piece of information. Furthermore, in a case that multiple PDU sessions are established, respective pieces of identification information correlated to the PDU sessions may be the same contents or may be different contents. Furthermore, the NSI identification information is information for identifying an NSI, and hereinafter may be an NSI ID or a Slice Instance ID.

As illustrated in FIG. 2, an access network_B may be any of Evolved Universal Terrestrial Radio Access Network (E-UTRAN)_A 80, a 5G-RAN_A 120, and a WLAN ANc 125. Note that an E-UTRAN_A 80 and/or a 5G-RAN_A 120 may be referred to as a 3GPP access network, and the WLAN ANc 125 may be referred to as a non-3GPP access network. Each radio access network includes an apparatus to which the UE_A 10 is actually connected (such as a base station apparatus and an access point), and the like.

For example, the E-UTRAN_A 80 is an LTE access network and includes one or more eNBs_A 45. An eNB_A 45 is a radio base station to which the UE_A 10 connects through an Evolved Universal Terrestrial Radio Access (E-UTRA). In a case that multiple eNBs are present in the E-UTRAN_A 80, the respective eNBs may be connected to one another.

Furthermore, the 5G-RAN_A 120 is a 5G access network, and configured to include one or more New Radio Access Technology nodes (NR nodes)_A 122. The NR node_A 122 is a radio base station to which the UE_A 10 connects through 5G Radio Access. Also, in a case that multiple NR nodes_A 122 are present in the 5G-RAN_A 120, the respective NR nodes_A 122 may be connected to one another.

Note that the 5G-RAN_A 120 may be an access network including the E-UTRA and/or the 5G Radio Access. In other words, the 5G-RAN_A 120 may include the eNB_A 45, may include the NR node_A 122, or may include both. In this case, the eNB_A 45 and the NR node_A 122 may be similar apparatuses. Therefore, the NR node_A 122 can be substituted for the eNB_A 45.

The WLAN ANc 125 is a radio LAN access network and configured to include one or more WLAN Access Gateways (WAGs)_A 126. The WAG_A 126 is a radio base station to which the UE_A 10 connects through the wireless LAN access. Furthermore, the WAG_A 126 may serve as a gateway between the core network_B 190 and the WLAN ANc 125. The WAG_A 126 may include a function unit for the radio base station and a function unit for the gateway, which are configured as different apparatuses.

Note that herein, the expression "the UE_A 10 is connected to each radio access network" is equivalent to "the UE_A 10 is connected to a base station apparatus, an access point, or the like included in each radio access network," and is equivalent to "data, signals, and the like transmitted and/or received also pass through the base station apparatus and the access point." Note that a control message transmitted and/or received between the UE_A 10 and the core network_B 190 may be the same control message, irrespective of a type of the access network. Therefore, the expression "the UE_A 10 and the core network_B 190 transmit and/or receive a message to and/or from each other via the NR node_A 122" may be equivalent to "the UE_A 10 and the core network_B 190 transmit a message to each other via the eNB_A 45 and/or the WAG_A 126."

Furthermore, the access network is a radio network connecting with the UE_A 10 and/or the core network. The access network may be a 3GPP access network, or a non-3GPP access network. Note that the 3GPP access network may be the E-UTRAN_A 80 and the 5G-Radio Access Network (RAN)_A 120, and the non-3GPP access network may be the WLAN ANc 125. Note that the UE_A 10 may connect to the access network for connection to the core network, or may connect to the core network via the access network.

Moreover, the DN_A 5 and the DN_B 105 are Data Networks that provide communication services to the UE_A 10, may be configured as packet data service networks, and may be configured for each service. Furthermore, the DN_A 5 and the DN_B 105 may include a connected communication terminal. Therefore, the connection with the DN_A 5 and/or the DN_B 105 may be a connection with a communication terminal or a server device deployed in the DN_A 5 and/or the DN_B 105. Furthermore, the transmission and/or reception of the user data to and/or from the DN_A 5 and/or the DN_B 105 may be a transmission and/or reception of the user data to and/or from the communication terminal or the server device deployed in the DN_A 5 and/or the DN_B 105. Although the DN_A 5 and/or the DN_B 105 are located outside the core network in FIG. 1, the DN_A 5 and/or the DN_B 105 may be located within the core network.

The core network_B 190 may be configured as one or more core network apparatuses. Here, the core network apparatus may an apparatus that performs some or all processes or functions of each apparatus included in the core network_B 190.

Furthermore, the core network is an IP mobile communication network, connected to the access network and/or the DN_A 5, that is operated by a mobile communication operator (Mobile Network Operator: MNO). The core network may be a core network for a mobile communication operator who operates and manages the mobile communication system 1, or may be a core network for virtual mobile communication operator or virtual mobile communication service provider, such as a Mobile Virtual Network Operator (MVNO) and a Mobile Virtual Network Enabler (MVNE). Note that the core network_B 190 may be an Evolved Packet Core (EPC) constituting an Evolved Packet System (EPS), or may be a 5G Core Network (5GC) constituting the 5GS. Furthermore, the core network_B 190 may be a core network for a system providing the 5G communication service. Note that the core network_B 190 is not limited to this, but may be a network for providing a mobile communication service.

Next, the core network_B 190 will be described. The core network_B 190 may include at least one of: an Authentication Server Function (AUSF), an Access and Mobility Management Function (AMF)_A 240, a Structured Data Storage network function (SDSF), an Unstructured Data Storage network function (UDSF), a Network Exposure Function (NEF), a NF Repository Function (NRF), a Policy Control Function (PCF), a Session Management Function (SMF)_A 230, a Session Management Function (SMF)_B 232, a Unified Data Management (UDM), a User Plane Function (UPF)_A 235, a User Plane Function (UPF)_B 237, an Application Function (AF), or a Non-3GPP Inter Working Function (N31WF). These may be configured as Network Functions (NFs). The NF may mean a processing function configured in the network.

FIG. 3 illustrates only the AMF (AMF_A 240), the SMF (SMF_A 230 and SMF_B 232), and the UPF (UPF_A 235 and UPF_B 237) among these for simplification, but this does not mean that ones (apparatus and/or NF) other than these are not included. Note that, for simplification, the UE_A 10 is referred to as the UE, the AMF_A 240 as the AMF, the SMF_A 230 and the SMF_B 232 as the SMF, the UPF_A 235 and the UPF_B 237 as the UPF, and the DN_A 5 and DN_B 105 as the DN.

FIG. 3 illustrates an N1 interface (hereinafter also referred to as a reference point), an N2 interface, an N3 interface, an N4 interface, an N6 interface, and an N11 interface. Here, the N1 interface is an interface between the UE and the AMF, the N2 interface is an interface between (R) access network (AN) and the AMF, and the N3 interface is an interface between the (R) access network (AN) and the UPF, the N4 interface is an interface between the SMF and the UPF, the N6 interface is an interface between the UPF and the DN, and the N11 interface is an interface between the AMF and the SMF. The respective apparatuses can perform communication by using these interfaces.

Note that FIG. 3 is a system configuration diagram in a case that the UE simultaneously accesses two DNs by using multiple PDU sessions. Two SMFs are selected for two different PDU sessions. In addition, there are two SMF_A 230 and two UPF_A 235 in FIG. 3.

The following briefly describes each apparatus included in the core network_B 190.

First, the AMF_A 240 is connected to another AMF, SMF (SMF_A 230 and/or SMF_B 232), the access network (i.e., the E-UTRAN_A 80, the 5G-RAN_A 120, and the WLAN ANc 125), the UDM, the AUSF, and the PCF. The AMF_A 240 may play roles as Registration management, Connection management, Reachability management, Mobility management of the UE_A 10 and the like, Session Management (SM) message transfer between the UE and the SMF, Access Authentication and Access Authorization, Security Anchor Function (SEA), Security Context Management (SCM), an N2 interface support for the N31WF, a support for transmission and/or reception of a NAS signal with the UE via the N3IWF, authentication of the UE connected via the N3IWF, management of Registration Management states (RM states), a management of Connection Management states (CM states), and the like. Additionally, one or more AMFs_A 240 may be deployed within the core network_B 190. The AMF_A 240 may be an NF that manages one or more Network Slice Instances (NSIs). The AMF_A 240 may be a common CP function (CCNF, Common Control Plane Network Function (CPNF)) shared among the multiple NSIs.

Additionally, the RM state includes a deregistered state (RM-DEREGISTERED state) and a registered state (RM-REGISTERED state). In the RM-DEREGISTERED state, since the UE is not registered with the network and a UE context in the AMF does not have information on a location and information on routing effective to the UE, the AMF is in a state in which the AMF is not reachable to the UE. Also, in the RM-REGISTERED state, since the UE is registered with the network, the UE can receive services that require a registration with the network.

Additionally, the CM state includes a disconnected state (CM-IDLE state) and a connected state (CM-CONNECTED state). In the CM-IDLE state, the UE is in the RM-REGISTERED state but does not have a NAS signaling connection established with the AMF via the N1 interface. Further, in the CM-IDLE state, the UE does not have the N2 interface connection (N2 connection) and the N3 interface connection (N3 connection).

Meanwhile, in the CM-CONNECTED state, the UE has the NAS signaling connection established with the AMF via the N1 interface. In the CM-CONNECTED state, the UE may have the N2 interface connection (N2 connection) and/or the N3 interface connection (N3 connection).

The SMF_A 230 is connected to the AMF_A 240, the UPF_A 235, the UDM, and the PCF. The SMF_B 232 is connected to the AMF_A 240, the UPF_B 237, the UDM, and the PCF. The SMF_A 230 and the SMF_B 232 may play roles as Session Management of the PDU session or the like, IP address allocation for the UE, UPF selection and control, a UPF configuration for routing a traffic to an appropriate destination, a function notifying an arrival of downlink data (Downlink Data Notification), an identifier of SM information specific to AN (for each AN) transmitted to the AN via the AMF through the N2 interface, determination of a Session and Service Continuity mode (SSC mode) for the session, a roaming function, and the like. Further, although the SMF_A 230 and the SMF_B 232 have been described as different apparatuses or NFs, they may be the same apparatus or function.

The UPF_A 235 is connected to the DN_A 5, the SMF_A 230, another UPF, and the access network (i.e., the E-UTRAN_A 80, the 5G-RAN_A 120, and the WLAN ANc 125). The UPF_B 237 is connected to the DN_B 105, the SMF_B 232, another UPF, and the access network (i.e., the E-UTRAN_A 80 and the 5G-RAN_A 120, and the WLAN ANc 125). The UPF_A 235 and the UPF_B 237 may play roles as an anchor to intra-RAT mobility or inter-RAT mobility, Packet routing & forwarding, an Uplink Classifier (UL CL) function supporting routing of multiple traffic flows to one DN, a Branching point function supporting multihomed PDU session, QoS processing for user plane, verification of an uplink traffic, buffering of downlink packets, a trigger function of Downlink Data Notification, and the like. Each of the UPF_A 235 and the UPF_B 237 may be a relay apparatus that forwards the user data as a gateway between the DN_A 5 and the core network_B 190 and a gateway between the DN_B 105 and the core network_B 190, respectively. Note that the UPF_A 235 and the UPF_B 237 may serve as a gateway for the IP communication and/or the non-IP communication. Furthermore, the UPF_A 235 and the UPF_B 237 may have a function to forward the IP communication, or may have a function to perform conversion between the non-IP communication and the IP communication. The multiple gateways located may serve as gateways connecting the core network_B 190 with a single DN. Note that the UPF_A 235 and the UPF_B 237 may have connectivity with another NF and may connect to each apparatus via another NF.

Although the UPF_A 235 and the UPF_B 237 have been described as separate apparatuses or NFs, a common UPF_C 239 (also referred to as a branching point or an uplink classifier), which is a UPF different from the UPF_A 235 and the UPF_B 237, may be present between the UPF_A 235 and the access network and between the UPF_B 237 and the access network. With the UPF_C 239 present, the PDU session between the UE_A 10 and the DN_A 5 is established via the access network, the UPF_C 239, and the UPF_A 235, and the PDU session between the UE_A 10 and the DN_B 105 is established via the access network, the UPF_C 239, and the UPF_B 237.

Note that the User Plane (U-Plane) may be a communication path for transmitting and/or receiving the user data, and may include multiple bearers. Furthermore, a Control Plane (C-Plane) may be a communication path for transmitting and/or receiving the control message, and may include multiple bearers.

Additionally, the AUSF is connected to the UDM and the AMF_A 240. The AUSF functions as an authentication server.

The SDSF provides a function for the NEF to store and acquire information as structured data.

The UDSF provides a function for all NFs to store and acquire information as unstructured data.

The NEF provides means to safely provide services and capabilities provided by the 3GPP network. The information received from another NF is stored as structured data.

In a case that the NRF receives an NF Discovery Request from an NF instance, the NRF provides information on the discovered NF instance to the NF or holds information on the NF instances available or services supported by the instances.

The PCF is connected to the SMF (SMF_A 230, SMF_B 232), the AF, and the AMF_A 240. A policy rule (policy rule) or the like is provided.

The UDM is connected to the AMF_A 240, the SMF (SMF_A 230, SMF_B 232), the AUSF, and the PCF. The UDM includes a UDM FE (application front end) and a User Data Repository (UDR). The UDM FE performs processing such as authentication information (credentials), location management, and subscriber management (subscription management). The UDR stores data required to be provided by the UDM FE to and policy profiles required by the PCF.

The AF is connected to the PCF. The AF affects traffic routing or involves the policy control.

The N3IWF provides functions, such as IPsec tunnel establishment with the UE, relaying of the NAS (N1) signaling between the UE and the AMF, processing of N2 signaling transmitted from the SMF and relayed by the AMF, establishment of IPsec Security Association (IPsec SA), relaying of a user plane packet between the UE and the UPF, and AMF selection.

1.2. Configuration of Each Apparatus

The configuration of each apparatus will be described below. Note that some or all of the functions of each apparatus and each unit in each apparatus described below may operate on physical hardware, or may operate on logical hardware virtually configured on general-purpose hardware.

1.2.1. Configuration of UE

Figure 4:
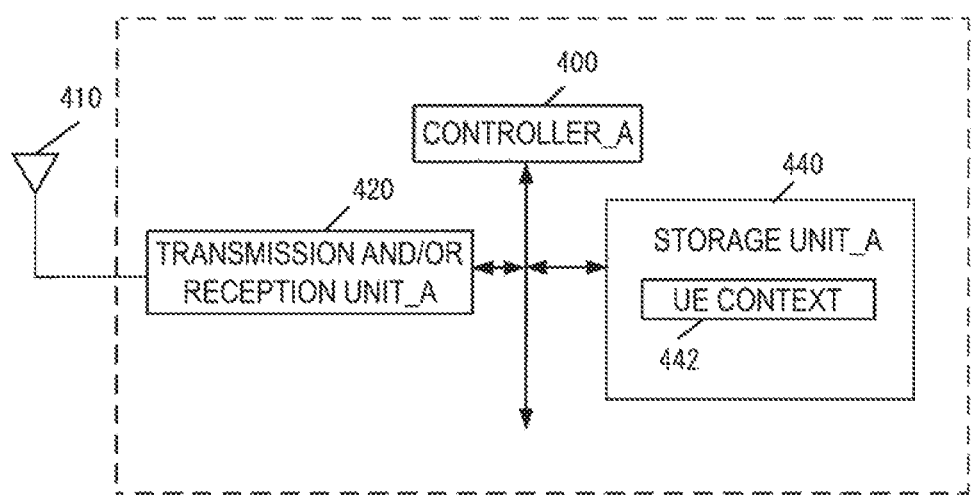
FIG. 4 is a diagram illustrating an apparatus configuration of UE.

First, FIG. 4 illustrates an apparatus configuration example of the UE_A 10. As illustrated in FIG. 4, the UE_A 10 includes a controller_A 400, a transmission and/or reception unit_A 420, and a storage unit_A 440. The transmission and/or reception unit_A 420 and the storage unit_A 440 are connected to the controller_A 400 via a bus. An external antenna_A 410 is connected to the transmission and/or reception unit_A 420. The storage unit_A 440 stores a UE context 442.

The controller_A 400 is a function unit for controlling the entire UE_A 10. The controller_A 400 reads out and performs various kinds of information and programs stored in the storage unit_A 440 to achieve various processes of the entire UE_A 10.

The transmission and/or reception unit_A 420 is a function unit through which the UE_A 10 connects to the base station (E-UTRAN_A 80 and 5G-RAN_A 120) and/or the access point (WLAN ANc 125) in the access network and connects to the access network. In other words, the UE_A 10 can connect to the base station and/or the access point in the access network via the external antenna 410 connected to the transmission and/or reception unit_A 420. Specifically, the UE_A 10 can transmit and/or receive the user data and/or the control information with the base station and/or the access point in the access network via the external antenna 410 connected to the transmission and/or reception unit_A 420.

The storage unit_A 440 is a function unit that stores programs, data, and the like necessary for each operation by the UE_A 10, and includes, for example, a semiconductor memory, a Hard Disk Drive (HDD), a Solid State Drive (SSD), and the like. The storage unit_A 440 stores identification information, control information, a flag, a parameter, and the like included in the control message transmitted and/or received in a communication procedure described later. The UE context 442 stored in the storage unit_A 440 may be a UE context used to connect to an access network_B 80/120/125 and a UE context used to connect to the core network_B 190. The UE context 442 may be a UE context stored for each UE, a UE context stored for each PDU session, and a UE context stored for each bearer. The UE context stored for each UE may include IMSI, EMM State, GUTI, and ME Identity. The UE context stored for each PDU session includes APN in Use, Assigned Session Type, IP Address(es), and Default Bearer. The UE context stored for each bearer may include an EPS Bearer ID, TI, and TFT.

1.2.2. Configuration of eNB/NR node/WAG

Figure 5:
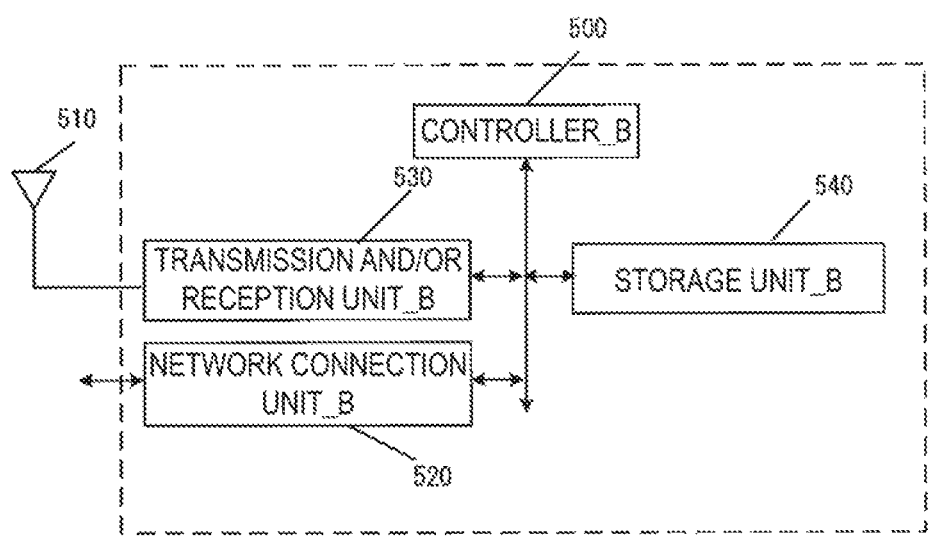
FIG. 5 is a diagram illustrating an apparatus configuration of eNB/NR node/WAG.

Next, FIG. 5 illustrates an apparatus configuration example of the eNB_A 45, the NR node_A 122, and the WAG_A 126. As illustrated in FIG. 5, the eNB_A 45, the NR node_A 122, and the WAG_A 126 include a controller_B 500, a network connection unit_B 520, a transmission and/or reception unit_B 530, and a storage unit_B 540. The network connection unit_B 520, the transmission and/or reception unit_B 530, and the storage unit_B 540 are connected to the controller_B 500 via a bus. An external antenna 510 is connected to the transmission and/or reception unit_B 530.

The controller_B 500 is a function unit for controlling the entire eNB_A 45, NR node_A 122, and WAG_A 126. The controller_B 500 reads out and performs various kinds of information and programs stored in the storage unit_B 540 to achieve various processes of the entire eNB_A 45, NR node_A 122, and WAG_A 126.

The network connection unit_B 520 is a function unit for the eNB_A 45, the NR node_A 122, and the WAG_A 126 to connect to the AMF_A 240 and the UPF_A 235 in the core network. In other words, the eNB_A 45, the NR node_A 122, and the WAG_A 126 are connectable to the AMF_A 240 and the UPF_A 235 in the core network via the network connection unit_B 520. Specifically, the eNB_A 45, the NR node_A 122, and the WAG_A 126 can transmit and/or receive the user data and/or the control information to and from the AMF_A 240 and/or the UPF_A 235 via the network connection unit_B 520.

The transmission and/or reception unit_B 530 is a function unit through which the eNB_A 45, the NR node_A 122, and the WAG_A 126 connect to the UE_A 10. In other words, the eNB_A 45, the NR node_A 122, and the WAG_A 126 can transmit and/or receive the user data and/or the control information to and from the UE_A 10 via the transmission and/or reception unit_B 530.

The storage unit_B 540 is a function unit for storing programs, data, and the like necessary for each operation by the eNB_A 45, the NR node_A 122, and the WAG_A 126.

The storage unit_B 540 includes, for example, a semiconductor memory, an HDD, an SSD, or the like. The storage unit_B 540 stores identification information, control information, a flag, a parameter, and the like included in the control message transmitted and/or received in a communication procedure described later. The storage unit_B 540 may store these pieces of information as the contexts for each UE_A 10.

1.2.3. Configuration of AMF

Figure 6:
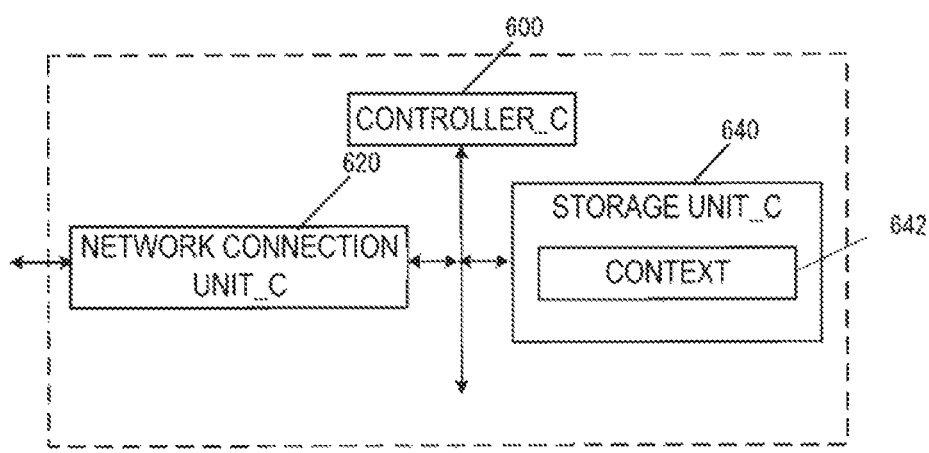
FIG. 6 is a diagram illustrating an apparatus configuration of an AMF.

Next, FIG. 6 illustrates an apparatus configuration example of the AMF_A 240. As illustrated in FIG. 6, the AMF_A 240 includes a controller_C 600, a network connection unit_C 620, and a storage unit_C 640. The network connection unit_C 620 and the storage unit_C 640 are connected to the controller_C 600 via a bus. The storage unit_C 640 stores a context 642.

The controller_C 600 is a function unit for controlling the entire AMF_A 240. The controller_C 600 reads out and performs various kinds of information and programs stored in the storage unit_C 640 to achieve various processes of the entire AMF_A 240.

The network connection unit_C 620 is a function unit for the AMF_A 240 to connect to another AMF_240, the SMF_A 230, the base station (E-UTRAN_A 80 and 5G-RAN_A 120), and/or the access point (WLAN ANc 125) in the access network, the UDM, the AUSF, and the PCF. In other words, the AMF_A 240 can transmit and/or receive the user data and/or the control information to and/or from the base station and/or the access point in the access network, the UDM, the AUSF, and the PCF via the network connection unit_C 620.

The storage unit_C 640 is a function unit that stores programs, data, and the like necessary for each operation by the AMF_A 240. The storage unit_C 640 includes, for example, a semiconductor memory, an HDD, an SSD, and the like. The storage unit_C 640 stores identification information, control information, a flag, a parameter, and the like included in the control message transmitted and/or received in a communication procedure described later. The context 642 stored in the storage unit_C 640 may be a context stored for each UE, a context stored for each PDU session, and a context stored for each bearer. The context stored for each UE may include IMSI, MSISDN, MM State, GUTI, ME Identity, UE Radio Access Capability, UE Network Capability, MS Network Capability, Access Restriction, MME F-TEID, SGW F-TEID, eNB Address, MME UE S1AP ID, eNB UE S1AP ID, NR node Address, NR node ID, WAG Address, and WAG ID. The context stored for each PDU session may include APN in Use, Assigned Session Type, IP Address(es), PGW F-TEID, SCEF ID, and Default bearer. The context stored for each bearer may include EPS Bearer ID, TI, TFT, SGW F-TEID, PGW F-TEID, MME F-TEID, eNB Address, NR node Address, WAG Address, eNB ID, NR node ID, and WAG ID.

1.2.4. Configuration of SMF

Figure 7:
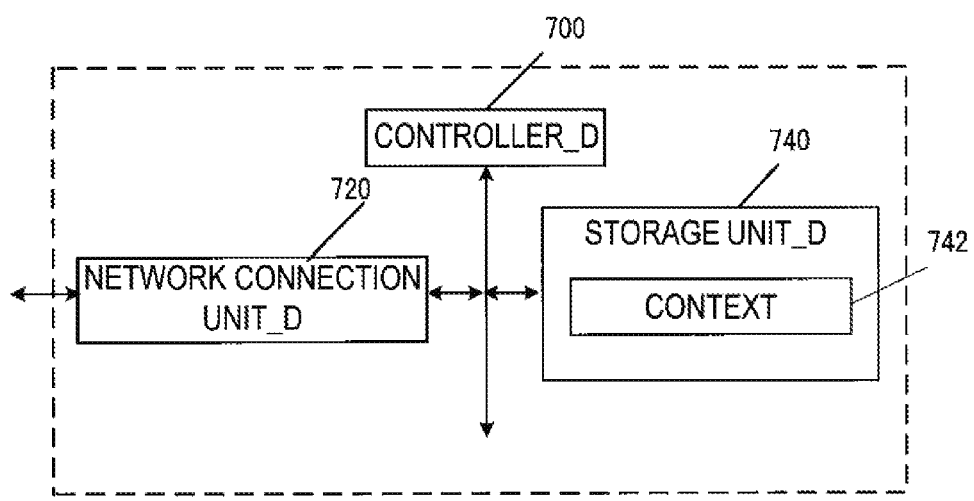
FIG. 7 is a diagram illustrating an apparatus configuration of SMF/UPF.

Next, FIG. 7 illustrates an apparatus configuration example of the SMF_A 230 and the SMF_B 232. As illustrated in FIG. 7, each of the SMFs_A 230 includes a controller_D 700, a network connection unit_D 720, and a storage unit_D 740. The network connection unit_D 720 and the storage unit_D 740 are connected to the controller_D 700 via a bus. The storage unit_D 740 stores a context 742.

The controller_D 700 in the SMF_A 230 is a function unit for controlling the entire SMF_A 230. The controller_D 700 reads out and performs various pieces of information and programs stored in the storage unit_D 740 to achieve various processes of the entire SMF_A 230.

The network connection unit_D 720 in the SMF_A 230 is a function unit for the SMF_A 230 to connect to the AMF_A 240, the UPF_A 235, the UDM, and the PCF. In other words, the SMF_A 230 can transmit and/or receive the user data and/or the control information to and from the AMF_A 240, the UPF_A 235, the UDM, and the PCF via the network connection unit_D 720.

The storage unit_D 740 in the SMF_A 230 is a function unit for storing programs, data, and the like necessary for each operation by the SMF_A 230. The storage unit_D 740 in the SMF_A 230 includes, for example, a semiconductor memory, an HDD, an SSD, or the like. The storage unit_D 740 in the SMF_A 230 stores identification information, control information, a flag, a parameter, and the like included in the control message transmitted and/or received in a communication procedure described later. The context 742 stored in the storage unit_D 740 in the SMF_A 230 may be a context stored for each UE, a context stored for each APN, a context stored for each PDU session, and a context stored for each bearer. The context stored for each UE may include IMSI, ME Identity, MSISDN, and RAT type. The context stored for each APN may include APN in use. Note that the context stored for each APN may be stored for each Data Network Identifier. The context stored for each PDU session may include Assigned Session Type, IP Address(es), SGW F-TEID, PGW F-TEID, and Default Bearer. The context stored for each bearer may include EPS Bearer ID, TFT, SGW F-TEID, and PGW F-TEID.

Note that the SMF_B 232 is configured similarly to the SMA_A 230.

1.2.5. Configuration of UPF

Next, FIG. 7 illustrates an apparatus configuration example of the UPF_A 235 and the UPF_B 237. As illustrated in FIG. 7, each of the UPF_A 235 includes the controller_D 700, the network connection unit_D 720, and the storage unit_D 740. The network connection unit_D 720 and the storage unit_D 740 are connected to the controller_D 700 via a bus. The storage unit_D 740 stores the context 742.

The controller_D 700 in the UPF_A 235 is a function unit for controlling the entire UPF_A 235. The controller_D 700 reads out and performs various pieces of information and programs stored in the storage unit_D 740 to achieve various processes of the entire UPF_A 235.

The network connection unit_D 720 in the UPF_A 235 is a function unit for the UPF_A 235 to connect to the DN (that is, the DN_A 5 and/or the DN_B 105), the SMF_A 230, another UPF_A 235, and the access network (that is, the E-UTRAN_A 80, the 5G-RAN_A 120, and the WLAN ANc 125). In other words, the UPF_A 235 can transmit and/or receive the user data and/or the control information to and from the DN (that is, the DN_A 5 and/or the DN_B 105), the SMF_A 230, another UPF_A 235, and the access network (that is, the E-UTRAN_A 80, 5G-RAN_A 120, and the WLAN ANc 125) via the network connection unit_D 720.

The storage unit_D 740 in the UPF_A 235 is a function unit for storing programs, data, and the like necessary for each operation by the UPF_A 235. The storage unit_D 740 in the UPF_A 235 includes, for example, a semiconductor memory, an HDD, an SSD, or the like. The storage unit_D 740 in the UPF_A 235 stores identification information, control information, a flag, a parameter, and the like included in the control message transmitted and/or received in a communication procedure described later. The context 742 stored in the storage unit_D 740 in the UPF_A 235 may be a context stored for each UE, a context stored for each APN, a context stored for each PDU session, and a context stored for each bearer. The context stored for each UE may include IMSI, ME Identity, MSISDN, and RAT type. The context stored for each APN may include APN in use. Note that the context stored for each APN may be stored for each Data Network Identifier. The context stored for each PDU session may include Assigned Session Type, IP Address(es), SGW F-TEID, PGW F-TEID, and Default Bearer. The context stored for each bearer may include EPS Bearer ID, TFT, SGW F-TEID, and PGW F-TEID.

Note that the UPF_B 237 is configured similarly to the UPF_A 235.

1.2.6. Information Stored in Storage Unit in Each Apparatus Described Above

Next, each piece of information stored in the storage unit in each apparatus described above will be described.

An International Mobile Subscriber Identity (IMSI) is permanent identification information of a subscriber (user), and is identification information assigned to a user using the UE. The IMSI stored by the UE_A 10, the MME_A 40/CPF_A 140/AMF_A 2400, and the SGW_A 35 may be the same as the IMSI stored by an HSS_A 50.

The EMM State/MM State indicates a Mobility management state of the UE_A 10 or an MME_A 40/CPF_A 140/AMF_A 240. For example, the EMM State/MM State may be an EMM-REGISTERED state (registered state) in which the UE_A 10 is registered in the network, and/or an EMM-DEREGISTERD state (deregistered state) in which the UE_A 10 is not registered in the network. The EMM State/MM State may be an ECM-CONNECTED state in which a connection is maintained between the UE_A 10 and the core network, and/or an ECM-IDLE state in which the connection is released. Note that the EMM State/MM State may be information with which a state in which the UE_A 10 is registered with the EPC and a state in which the UE_A 10 is registered with the NGC or the 5GC can be distinguished.

Globally Unique Temporary Identity (GUTI) is temporary identification information of the UE_A 10. The GUTI includes identification information of the MME_A 40/CPF_A 140/AMF_A 240 (Globally Unique MME Identifier (GUMMEI)) and identification information of the UE_A 10 in a specific MME_A 40/CPF_A 140/AMF_A 240 (M-Temporary Mobile Subscriber Identity (M-TMSI)). ME Identity is an ID of the UE_A 10 or the ME, and may be International Mobile Equipment Identity (IMEI) or IMEI Software Version (IMEISV), for example. MSISDN represents a basic phone number of the UE_A 10. The MSISDN stored by the MME_A 40/CPF_A 140/AMF_A 240 may be information indicated by a storage unit in the HSS_A 50. Note that the GUTI may include information for identifying the CPF_140.

The MME F-TEID is information for identifying the MME_A 40/CPF_A 140/AMF_A 240. The MME F-TEID may include an IP address of the MME_A 40/CPF_A 140/AMF_A 240, may include a Tunnel Endpoint Identifier (TEID) of the MME_A 40/CPF_A 140/AMF_A 240, or may include both of them. The IP address of the MME_A 40/CPF_A 140/AMF_A 240 and the TEID of the MME_A 40/CPF_A 140/AMF_A 240 may be stored independently. The MME F-TEID may be identification information for user data, or identification information for control information.

SGW F-TEID is information for identifying the SGW_A 35. The SGW F-TEID may include an IP address of the SGW_A 35, a TEID of the SGW_A 35, or both of them. The IP address of the SGW_A 35 and the TEID of the SGW_A 35 may be stored independently of each other. The SGW F-TEID may be identification information for user data, or identification information for control information.

The PGW F-TEID is information for identifying the PGW_A 30/UPGW_A 130/SMF_A 230/UPF_A 235. The PGW F-TEID may include an IP address of the PGW_A 30/UPGW_A 130/SMF_A 230/UPF_A 235, may include a TEID of the PGW_A 30/UPGW_A 130/SMF_A 230/UPF_A 235, or may include both of them. The IP address of the PGW_A 30/UPGW_A 130/SMF_A 230/UPF_A 235, and the TEID of the PGW_A 30/UPGW_A 130/SMF_A 230/UPF_A 235 may be stored independently. The PGW F-TEID may be identification information for user data, or identification information for control information.

eNB F-TEID is information for identifying the eNB_A 45. The eNB F-TEID may include an IP address of the eNB_A 45, a TEID of the eNB_A 45, or both of them. The IP address of the eNB_A 45 and the TEID of the SGW_A 35 may be stored independently of each other. The eNB F-TEID may be identification information for user data, or identification information for control information.

The APN may be identification information for identifying the core network and an external network such as the DN. Furthermore, the APN can also be used as information for selecting a gateway such as the PGW_A 30/UPGW_A 130/UPF_A 235 connecting the core network A_90. Note that the APN may be a Data Network Name (DNN). Accordingly, the APN may be represented as the DNN, or the DNN may be represented as the APN.

Note that the APN may be identification information for identifying such a gateway, or may be identification information for identifying an external network such as the DN. Note that in a case that multiple gateways connecting the core network and the DN are located, there may be multiple gateways that can be selected according to the APN. Furthermore, one gateway may be selected from among such multiple gateways by another scheme using identification information other than the APN.

UE Radio Access Capability is identification information indicating a radio access capability of the UE_A 10. UE Network Capability includes an algorithm of security supported by the UE_A 10 and a key derivative function. The MS Network Capability is information including, in the UE_A 10 having a function of a GERAN_A 25 and/or a UTRAN_A 20, one or more pieces of information necessary for an SGSN_A 42. Access Restriction is registration information for access restriction. eNB Address is an IP address of the eNB_A 45. The MME UE S1AP ID is information for identifying the UE_A 10 in the MME_A 40/CPF_A 140/AMF_A 240. eNB UE S1AP ID is information for identifying the UE_A 10 in the eNB_A 45.

APN in Use is an APN recently utilized. The APN in Use may be Data Network Identifier. This APN may include identification information of the network and identification information of a default operator. Furthermore, the APN in Use may be information for identifying a DN with which the PDU session is established.

Assigned Session Type is information indicating a PDU session type. The Assigned Session Type may be Assigned PDN Type. The PDU session type may be an IP, or a non-IP. Furthermore, in a case that the PDU session type is an IP, information indicating a PDN type assigned by the network may be further included. Note that the Assigned Session Type may be IPv4, IPv6, or IPv4v6.

Unless otherwise specifically described, the IP Address refers to the IP address assigned to the UE. The IP address may be an IPv4 address, an IPv6 address, or an IPv6 prefix.

Note that in a case that the Assigned Session Type indicates a non-IP, an element of the IP Address need not be contained.

DN ID is identification information for identifying the core network_B 190 and an external network such as the DN. Furthermore, the DN ID can also be used as information for selecting a gateway such as the UPGW_A 130 or the PF_A 235 connecting the core network_B 190.

Note that the DN ID may be identification information for identifying such a gateway, or may be identification information for identifying an external network such as the DN. Note that in a case that multiple gateways connecting the core network_B 190 and the DN are located, there may be multiple gateways that can be selected according to the DN ID. Furthermore, one gateway may be selected from among such multiple gateways by another scheme using identification information other than the DN ID.

Furthermore, the DN ID may be information equivalent to the APN, or different from the APN. Note that in a case that the DN ID is the information different from the APN, each apparatus may manage information indicating a correspondence relationship between the DN ID and the APN, may perform a procedure to inquire the APN using the DN ID, or may perform a procedure to inquire the DN ID using the APN.

SCEF ID is an IP address of an SCEF_A 46 used in the PDU session. The Default Bearer is information acquired and/or created in establishing the PDU session, and is EPS bearer identification information for identifying a default bearer correlated to the PDU session.

EPS Bearer ID is identification information of the EPS bearer. The EPS Bearer ID may be identification information for identifying Signalling Radio Bearer (SRB) and/or Control-plane Radio bearer (CRB), or identification information for identifying Data Radio Bearer (DRB). A Transaction Identifier (TI) is identification information for identifying a bidirectional message flow (Transaction). Note that the EPS Bearer ID may be EPS bearer identification information for identifying a dedicated bearer. Therefore, the EPS bearer ID may be identification information for identifying the EPS bearer different from the default bearer. The TFT indicates all the packet filters associated with the EPS bearer. The TFT is information for identifying some pieces of the transmitted and/or received user data, and thus, the UE_A 10 uses the EPS bearer associated with the TFT to transmit and/or receive the user data identified by the TFT. In still other words, the UE_A 10 uses Radio Bearer (RB) associated with the TFT to transmit and/or receive the user data identified by the TFT. The TFT may associate the user data such as the transmitted and/or received application data with an appropriate transfer path, and may be identification information for identifying the application data. The UE_A 10 may use the default bearer to transmit and/or receive the user data which cannot be identified by the TFT. The UE_A 10 may store in advance the TFT associated with the default bearer.

The Default Bearer is EPS bearer identification information for identifying a default bearer associated with a PDU session. Note that the EPS bearer may be a logical communication path established between the UE_A 10 and the PGW_A 30/UPGW_A 130/UPF_A 235, or may be a communication path constituting the PDN connection/PDU session. Furthermore, the EPS bearer may be a default bearer, or a dedicated bearer. Furthermore, the EPS bearer may include an RB established between the UE_A 10 and the base station and/or the access point in the access network. Furthermore, the RB and the EPS bearer may be associated with each other on a one-to-one basis. Therefore, identification information of the RB may be associated with the identification information of the EPS bearer on a one-to-one basis, or may be the same identification information as the identification information of the EPS bearer. Note that the RB may be the SRB and/or the CRB, or the DRB. The Default Bearer may be information that the UE_A 10 and/or the SGW_A 35 and/or the PGW_A 30/UPGW_A 130/SMF_A 230/UPF_A 235 acquire from the core network in establishing the PDU session. Note that the default bearer is an EPS bearer first established during the PDN connection/PDU session, and is such an EPS bearer that only one bearer can be established during one PDN connection/PDU session. The default bearer may be an EPS bearer that can be used to communicate user data not associated with the TFT. The dedicated bearer is an EPS bearer established after the default bearer is established during the PDN connection/PDU session, and is such an EPS bearer that multiple bearers can be established during one PDN connection/PDU session. The dedicated bearer is an EPS bearer that can be used to communicate user data not associated with the TFT.

User Identity is information for identifying a subscriber. The User Identity may be an IMSI, or an MSISDN. Furthermore, the User Identity may also be identification information other than an IMSI or an MSISDN. Serving Node Information is information for identifying the MME_A 40/CPF_A 140/AMF_A 240 used in the PDU session, and may be an IP address of the MME_A 40/CPF_A 140/AMF_A 240.

eNB Address is an IP address of the eNB_A 45. eNB ID is information for identifying the UE in the eNB_A 45. An MME Address is an IP address of the MME_A 40/CPF_A 140/AMF_A 240. An MME ID is information for identifying the MME_A 40/CPF_A 140/AMF_A 240. NR node Address is an IP address of the NR node_A 122. NR node ID is information for identifying the NR node_A 122. WAG Address is an IP address of the WAG_A 126. The WAG ID is information for identifying the WAG_A 126.

1.3. Description of Initial Procedure

Next, before describing detailed processes of an initial procedure in the present embodiment, in order to avoid redundant descriptions, terminology specific to the present embodiment and primary identification information used in each procedure will be described beforehand.

First, the network refers to at least some of the access network_B 80/120/125, the core network_B 190, the DN_A 5, and the DN_B 105. One or more apparatuses included in at least some of the access network_B 80/120/125, the core network_B 190, the DN_A 5, and the DN_B 105 may also be referred to as a network or a network apparatus.

Specifically, the expression "the network performs transmission and/or reception of a message and/or performs a procedure" signifies that "an apparatus (network apparatus) in the network performs transmission and/or reception of a message and/or performs a procedure".

The first DN is a general DN. That is, the first DN may be a DN (also referred to as LADN in the present embodiment) which is not a DN for Mobile Edge Computing (MEC), or may be a DN at a location not near from a point to which the UE_A 10 accesses. The service provided by the first DN may be managed and/or operated by a third party or may be managed and/or operated by an operator. Note that the DN_A 5 in FIG. 1 and FIG. 3 corresponds to the first DN.

The second DN is not a general DN but is a DN (that is, the LADN) for the MEC. That is, the second DN may be a local DN located near the point to which the UE_A 10 accesses or may be a DN at a location not far from the point to which the UE_A 10 accesses. The service provided by the second DN may be managed and/or operated by the third party or may be managed and/or operated by the operator. Note that the DN_B 105 in FIG. 1 and FIG. 3 corresponds to the second DN. Note that the second DN may be a general DN similarly to the first DN.

A Session Management (SM) message (also referred to as a Non-Access-Stratum (NAS) SM message) may be a NAS message used in a procedure for the SM, or may be a control message transmitted and/or received between the UE_A 10 and the SMF_A 230 or the SMF_B 232 via the AMF_A 240. Furthermore, the SM message may include a PDU session establishment request message, a PDU session establishment accept message, a PDU session completion message, a PDU session reject message, a PDU session modification request message, a PDU session modification accept message, a PDU session modification reject message, and the like. The procedure for SM may include a PDU session establishment procedure, a PDU session modification procedure, and the like.

Additionally, the first state is a state in which the UE_A 10 has established the PDU session to the first DN but is not connected to the second DN. Additionally, in the first state, the UE_A 10 may be in a state in which user data communication can be performed on the first DN but the user data communication cannot be performed on the second DN. The first state may be a state in which the user data communication can be performed with the AF on the first DN but the user data communication cannot be performed with the AF on the second DN.

Additionally, the second state is a state in which the UE_A 10 has established the PDU session to the first DN and has established the PDU session to connect to the second DN. In the second state, the UE_A 10 may be in a state in which the user data communication can be performed on the first DN and the user data communication can be performed on the second DN. In the second state, the UE_A 10 may be in a state in which the user data communication can be performed with the AF on the first DN and the user data communication can be performed with the AF on the second DN.

A third state is a state in which the UE_A 10 has not established the PDU session to the first DN but is connected to the second DN. In the third state, the UE_A 10 may be in a state in which the user data communication cannot be performed on the first DN but the user data communication can be performed on the second DN. In the third state, the UE_A 10 may be in a state in which the user data communication cannot be performed with the AF on the first DN but the user data communication can be performed with the AF on the second DN.

Furthermore, a tracking area (also referred to as a Tracking Area: TA) is a range that is managed by the core network and can be represented by position information of the UE_A 10. The tracking area may include one or more cells, for example.

Furthermore, the TA may be a range in which a control message such as a paging message is broadcasted, or may be a range in which the UE_A 10 can move without a handover procedure.

A TA list is a list including one or more TAs assigned to the UE_A 10 by the network. Note that while the UE_A 10 moves within one or more TAs included in the TA list, the UE_A 10 may be able to move without performing a registration procedure. In other words, the TA list may be an information group indicative of an area in which the UE_A 10 can move without performing the registration procedure.

A Network Slice is a logical network that provides specific network capabilities and network performance.

Moreover, a Network Slice Instance (NSI) includes an instance (entity) of the network function (NF) and a set of required resources, and forms a deployed network slice. Here, the NF is a processing function in the network and is employed or defined in the 3GPP. The NSI is an entity of one or more Network Slices configured in the core network_B 190. The NSI may include a virtual Network Function (NF) generated using a Network Slice Template (NST). Here, the NST is associated with a resource request for providing a required communication service or capability, and is a logical expression of one or more Network Functions (NFs). Specifically, the NSI may be an aggregation including multiple NFs in the core network_B 190. The NSI may be a logical network configured to classify the user data delivered through a service or the like. The network slice may include one or more NFs. The NF included in the network slice may be an apparatus shared by another network slice or otherwise. The UE can be assigned to the one or more network slices, based on a UE usage type and/or one or more network slice type IDs and/or one or more pieces of registration information such as an NS ID and/or the APN.

The Session and Service Continuity (SSC) mode indicates a mode of Session and Service Continuity supported by a system and/or each apparatus in the 5GC. To be more specific, the SSC mode may be a mode indicating a type of the session and service continuity supported by a PDU session established between the UE_A 10 and Terminating User-Plane Function (TUPF). Here, the TUPF may be the UPGW_A 130 or may be the UPF_A 235. Note that the SSC mode may be a mode indicating a type of the session and service continuity configured for each PDU session. Furthermore, the SSC mode may include three modes of an SSC mode 1, an SSC mode 2, and an SSC mode 3.

Here, the TUPF may be a Network Function (NF) for a User Plane (U-Plane). Furthermore, the TUPF may be located in the core network or may be located in the access network.

The SSC mode 1 is a mode of the session and service continuity in which the same TUPF is continuously maintained regardless of access technology such as Radio Access Technology (RAT) and the cell used by the UE_A 10 to connect to the network. To be more specific, the SSC mode 1 may be a mode in which even in a case that the mobility of the UE_A 10 occurs, the session and service continuity is achieved without changing the TUPF used by the established PDU session.

The SSC mode 2 is a mode of the session and service continuity in which the same TUPF is continuously maintained only in a serving area of the TUPF. To be more specific, the SSC mode 2 may be a mode in which as long as the UE_A 10 is in the serving area of the TUPF, the session and service continuity is achieved without changing the TUPF used by the established PDU session. The SSC mode 2 may be a mode in which in a case that the mobility that the UE_A 10 leaves the serving area of the TUPF occurs, the session and service continuity is achieved by changing the TUPF used by the established PDU session.

Here, the serving area of the TUPF may be an area in which one TUPF can provide a session and service continuity function, or a subset of the access network such as the RAT or the cell used in a case that the UE_A 10 connects to a network. The subset of the access network may be a network including one or multiple RATs and/or cells, or may be the TA.

The SSC mode 3 is a mode of the session and service continuity that allows a new PDU session and/or communication path to be established via a new TUPF to the same DN before disconnecting the PDU session and/or the communication path established between the UE_A 10 and the TUPF. The SSC mode 3 may be a mode of the session and service continuity that allows the UE_A 10 to be multi-homed. The SSC mode 3 may be a mode that allows the session and service continuity using multiple PDU sessions and/or the TUPFs correlated to the PDU sessions. In other words, in the case of the SSC mode 3, each apparatus may achieve the session and service continuity using the multiple PDU sessions, or may achieve the session and service continuity using the multiple TUPFs.

Here, in the case that each apparatus establishes a new PDU session and/or communication path, a new TUPF may be selected by the network, or a new TUPF may be an optimal TUPF for a location at which the UE_A 10 connects to the network. In a case that the multiple PDU sessions and/or the TUPFs used by the PDU sessions are effective, the UE_A 10 may correlate the application and/or flow communication to a new established PDU session immediately or based on the completion of the communication.

Next, the identification information in the present embodiment will be described.

First, 1st identification information is capability information indicating that the UE_A 10 supports the connection to the second DN. In other words, the 1st identification information may be information indicating that the UE_A 10 supports PDU session establishment to connect to the second DN. Note that the PDU session to connect to the second DN may be a PDU session established between the second DN and the UE_A 10, or may be a PDU session established between the UPF_A 235 and the UE_A 10 to connect the core network and the second DN. Further, the PDU session to connect to the second DN may be a PDU session used for the user data communication performed between the second DN and the UE_A 10. As a more specific example, the 1st identification information may be a DNN identifying the second DN.

11th identification information is capability information indicating that the network supports the connection to the second DN. In other words, the 11th identification information may be information indicating that the network supports the PDU session establishment to connect to the second DN or may be information indicating that the network allows the PDU session establishment.

12th identification information is information indicating a cause value. The 12th identification information may be information indicating that some requests have been rejected.

Furthermore, the 12th identification information may be information indicating that the PDU session establishment to connect to the second DN is temporarily prohibited, or may be information indicating that changing a connection destination of the PDU session being established to the second DN is temporarily prohibited.

Further, the 12th identification information may be information indicating that PDU session establishment to connect to the second DN is prohibited in cell and/or TA to which the UE_A 10 is currently connected, or may be information indicating that changing the connection destination of the PDU session being established to the second DN is prohibited.

Furthermore, each piece of information indicated by the 12th identification information, information indicated by the 12th identification information, and/or the 13th identification information may be single piece of identification information. In other words, the 12th identification information together with any one piece of identification information of the 13th identification information to the 13th identification information may be a single piece of identification information including significance of each piece of identification information. Therefore, the 12th identification information and the 13th identification information may be included in the control message as a single piece of identification information having significance of both two pieces of identification information.

The 13th identification information is information indicating a value of a first timer. The UE_A 10 may configure a value indicated by the 13th identification information to the first timer based on the reception of the 13th identification information or may start running the first timer.

The 14th identification information is a DNN indicating a DN to which the UE_A 10 can access in the currently connected cell and/or TA. Further, the 14th identification information may be a DNN indicating a DN to which the UE_A 10 can access as the second DN in the currently connected cell and/or TA. Note that the 14th identification information may include one or more DNNs. Further, each DNN may be correlated to information indicating whether the DNN is the second DN.

21st identification information is information indicating a cause value indicating that the present procedure has been rejected. The 21st identification information may be information indicating that the network does not support the connection to the second DN or may be information indicating that the network does not allow the connection.

Furthermore, the 21st identification information may be information indicating that the connection to the second DN is temporarily prohibited, or may be information indicating that the connection to the second DN is prohibited in the cell and/or TA to which the UE_A 10 is currently connected.

Furthermore, each piece of information indicated by the 21st identification information, information indicated by the 21st identification information, and/or 22nd identification information may be single piece of identification information. In other words, the 21st identification information together with any one piece of identification information of the 22nd identification information to the 22nd identification information may be a single piece of identification information including significance of each piece of identification information. Therefore, the 21st identification information and the 22nd identification information may be included in the control message as a single piece of identification information having significance of both two pieces of identification information.

The 22nd identification information is information indicating a value of a second timer. The UE_A 10 may configure a value indicated by the 22nd identification information to the second timer based on the reception of the 22nd identification information or may start running the second timer.

31st identification information is information indicating a request to configure a new connection destination of the PDU session established or changed by the present procedure to the second DN, and/or information indicating a request to configure a communication destination of user data communication that can be performed using each piece of identification information requested together with the 31st identification information to the second DN. The 31st identification information may be correlated to one or more pieces of 32nd identification information to 35th identification information. More specifically, correlating the 31st identification information to the 32nd identification information may indicate that the DN requested with the 32nd identification information is the second DN, or correlating the 31st identification information to 33rd identification information may indicate that the connection destination of the PDU session requested with the 33rd identification information is the second DN. Further, correlating the 31st identification information to 34th identification information may indicate that a PDU session type and/or an address requested with the 34th identification information may be a PDU session type and/or an address used in the user data communication performed with the second DN. Further, correlating the 31st identification information to 35th identification information may indicate that a TFT requested with the 35th identification information is a TFT used in the user data communication performed with the second DN.

Furthermore, each piece of information indicated by the 31st identification information, information indicative of being the second DN indicated by the 31st identification information, and/or the 32nd to the 35th identification information may be single piece of identification information. In other words, the 31st identification information together with any one piece of identification information of the 32nd identification information to the 35th identification information may be a single piece of identification information including significance of each piece of identification information.

Accordingly, the 31st identification information and the 32nd identification information may be included in the control message as a single piece of identification information having significance of both two pieces of identification information. Alternatively, the 31st identification information and the 33rd identification information may be included in the control message as a single piece of identification information having significance of both two pieces of identification information. Furthermore, the 31st identification information and the 33rd identification information may be included in the control message as a single piece of identification information having significance of both two pieces of identification information. The 31st identification information and the 34th identification information may be included in the control message as a single piece of identification information having significance of both two pieces of identification information.

Furthermore, the 31st identification information may be information indicating a request for establishment or change of the PDU session. Furthermore, the 31st identification information may be information indicating a request to establish the PDU session to connect to the second DN, or may be information indicating a request to change the connection destination of the PDU session to the second DN.

The 32nd identification information is information indicating the DNN. The 32nd identification information may be information indicating a request to configure the connection destination of the PDU session established or changed by the present procedure to the DN identified by the DNN indicated by the identification information, or may indicate a request to configure the connection destination of the PDU session to the second DN. Furthermore, the 32nd identification information may include multiple pieces of information indicating the DNN, or may include information indicating whether each DNN is the second DN.

Furthermore, the 32nd identification information may be information indicating a request to establish the PDU session to connect to the second DN, may be information indicating a request to change the connection destination of the PDU session to the second DN, or may be information indicating a request to configure the PDU session established or changed by the present procedure to a PDU session used in the user data communication performed on the second DN.

The 33rd identification information is information indicating the PDU session ID. The 33rd identification information may be information indicating a request to establish or change the PDU session identified with the PDU session ID indicated by the identification information, or may indicate a request to configure a new connection destination of the PDU session identified with the PDU session ID indicated by the identification information to the second DN.

Furthermore, the 33rd identification information may be information indicating a request to establish the PDU session to connect to the second DN, may be information indicating a request to change the connection destination of the PDU session to the second DN, or may indicate a request to configure the PDU session established or changed by the present procedure to a PDU session used in the user data communication performed on the second DN.

The 34th identification information is information indicating a PDU session Type. The 34th identification information may be information indicating an address. Note that the PDU session type may be IPv4, IPv6, Ethernet, Unstructured, or the like. Furthermore, the address may be an IPv4 address, an IPv6 address, an IPv6 prefix, or may be information identifying the UE_A 10 used in communication such as the Ethernet and the Unstructured. Note that the PDU session type and address are not limited to these.

Furthermore, the 34th identification information may be information indicating a request to configure a PDU session type of the PDU session established or changed by the present procedure to the PDU session type indicated by the identification information, or may be information indicating a request to configure an address correlated to the PDU session established or changed by the present procedure to an address indicated by the identification information and/or an address of the PDU session type indicated in the present embodiment.

Furthermore, the 34th identification information may be information indicating a request to configure the PDU session type of the address used in the user data communication performed on the second DN to the PDU session type indicated by the identification information, or may be information indicating a request to configure the address used in the user data communication performed on the second DN to the address indicated by the identification information and/or the address of the PDU session type indicated in the present embodiment.

Further, the 34th identification information may include multiple pieces of information indicating the PDU session type and/or the address, may include information indicating whether each PDU session type is the PDU session type used in the user data communication performed on the second DN, or may include information indicating whether each address is an address used in the user data communication performed on the second DN.

Furthermore, the 34th identification information may be information indicating a request to establish the PDU session to connect to the second DN, may be information indicating a request to change the connection destination of the PDU session to the second DN, or may be information indicating a request to configure the PDU session established or changed by the present procedure to a PDU session used in the user data communication performed on the second DN.

The 35th identification information is information indicating the TFT. The 35th identification information may be information indicating a request to configure a TFT correlated to the PDU session established or changed by the present procedure to the TFT indicated by the identification information, or may be information indicating a request to configure the TFT used in the user data communication performed on the second DN to the TFT indicated by the identification information.

Further, the 35th identification information may include multiple pieces of information indicating the TFT or may include information indicating whether each TFT is the TFT used in the user data communication performed on the second DN.

Furthermore, the 35th identification information may be information indicating a request to establish the PDU session to connect to the second DN, may be information indicating a request to change the connection destination of the PDU session to the second DN, or may be information indicating a request to configure the PDU session established or changed by the present procedure to the PDU session used in the user data communication performed on the second DN.

41st identification information is information indicating that a new connection destination of the PDU session established or changed by the present procedure is the second DN, and/or information indicating that the communication destination of the user data communication that can be performed using the identification information transmitted and/or received together with the 41st identification information is the second DN. The 41st identification information may be correlated to one or more pieces of identification information of 42nd identification information to 45th identification information, and transmitted and/or received.

More specifically, correlating the 41st identification information to the 42nd identification information may indicate that the DN identified by the DNN indicated by the 42nd identification information is the second DN, or correlating the 41st identification information to the 43rd identification information may indicate that the connection destination of the PDU session identified by the PDU session ID indicated by the 43rd identification information is the second DN. Further, correlating the 41st identification information to 44th identification information may indicate that the address indicated by the 44th identification information and/or the address of the PDU session type indicated by the 44th identification information is an address used in the user data communication performed with the second DN, or correlating the 41st identification information to the 44th identification information may indicate that the TFT indicated by the 44th identification information may be a TFT used in the user data communication performed with the second DN.

Furthermore, each piece of information indicated by the 41st identification information, information indicative of being the second DN indicated by the 41st identification information, and/or the 42nd identification information to the 45th identification information may be a single piece of identification information. In other words, the 41st identification information together with any one piece of identification information of the 42nd identification information to the 45th identification information may be a single piece of identification information including significance of each piece of identification information.

Accordingly, the 41st identification information and the 42nd identification information may be included in the control message as a single piece of identification information having significance of both two pieces of identification information. The 41st identification information and the 43rd identification information may be included in the control message as a single piece of identification information having significance of both two pieces of identification information. Furthermore, the 41st identification information and the 43rd identification information may be included in the control message as a single piece of identification information having significance of both two pieces of identification information. The 41st identification information and the 44th identification information may be included in the control message as a single piece of identification information having significance of both two pieces of identification information.

Furthermore, the 41st identification information may be information indicating that the request for establishment or change of the PDU session has been accepted. Furthermore, the 41st identification information may be information indicating that the PDU session establishment to connect to the second DN is allowed, or may be information indicating that the change of the connection destination of the PDU session to the second DN is allowed.

The 42nd identification information is information indicating the DNN. The 42nd identification information may be information indicating that the connection destination of the PDU session established or changed by the present procedure becomes the DN identified by the DNN indicated by the identification information, or may indicate that the connection destination of the PDU session becomes the second DN. Furthermore, the 42nd identification information may include multiple pieces of information indicating the DNN, or may include information indicating whether each DNN is the second DN.

Further, the 42nd identification information may be information indicating that the PDU session to connect to the second DN has been established, may be information indicating that the connection destination of the PDU session has been changed to the second DN, or may be information indicating that the PDU session established or changed by the present procedure has become the PDU session used in the user data communication performed on the second DN.

The 43rd identification information is information indicating the PDU session ID. The 43rd identification information may be information indicating that the PDU session identified by the PDU session ID indicated by the identification information is established or changed, or may indicate that a new connection destination of the PDU session identified by the PDU session ID indicated by the identification information becomes the second DN.

Further, the 43rd identification information may be information indicating that the PDU session to connect to the second DN has been established, may be information indicating that the connection destination of the PDU session has been changed to the second DN, or may be information indicating that the PDU session established or changed by the present procedure has become the PDU session used in the user data communication performed on the second DN.

The 44th identification information is information indicating the PDU session type. The 44th identification information may be information indicating the address. Furthermore, the 44th identification information may be information indicating that the PDU session type of the PDU session established or changed by the present procedure has become the PDU session type indicated by the identification information, or may be information indicating that the address correlated to the PDU session established or changed by the present procedure has become the address indicated by the identification information and/or the address of the PDU session type indicated in the present embodiment.

Furthermore, the 44th identification information may be information indicating that the PDU session type of the address used in the user data communication performed on the second DN has become the PDU session type indicated by the identification information, or may be information indicating that the address used in the user data communication performed on the second DN has become the address indicated by the identification information and/or the address of the PDU session type indicated in the present embodiment.

Further, the 44th identification information may include multiple pieces of information indicating the PDU session type and/or the address, may include information indicating whether each PDU session type is a PDU session type used in user data communication performed on the second DN, or may include information indicating whether each address is the address used in the user data communication performed on the second DN.

Further, the 44th identification information may be information indicating that the PDU session to connect to the second DN has been established, may be information indicating that the connection destination of the PDU session has been changed to the second DN, or may be information indicating that the PDU session established or changed by the present procedure has become the PDU session used in the user data communication performed on the second DN.

The 45th identification information is information indicating the TFT. The 45th identification information may be information indicating that the TFT correlated to the PDU session established or changed by the present procedure has become the TFT indicated by the identification information, or may be information indicating that the TFT used in the user data communication performed on the second DN has become the TFT indicated by the identification information.

Further, the 45th identification information may include multiple pieces of information indicating the TFT or may include information indicating whether each TFT is the TFT used in the user data communication performed on the second DN.

Further, the 45th identification information may be information indicating that the PDU session to connect to the second DN has been established, may be information indicating that the connection destination of the PDU session has been changed to the second DN, or may be information indicating that the PDU session established or changed by the present procedure has become the PDU session used in the user data communication performed on the second DN.

51st identification information is information indicating a cause value indicating that the present procedure has been rejected. The 51st identification information may be information indicating that a request for PDU session establishment to connect to the second DN has been rejected.

Furthermore, the 51st identification information may be information indicating that the request for the PDU session establishment to connect to the second DN has been rejected, or may be information indicating that the request to change the connection destination of the PDU session being established to the second DN has been rejected. Furthermore, the 51st identification information may be information indicating that a request for configuring a communication destination of the user data communication using each piece of identification information received through the request message to the second DN has been rejected is rejected.

Furthermore, the 51st identification information may be information indicating that the PDU session establishment to connect to the second DN is temporarily prohibited, or may be information indicating that changing the connection destination of the PDU session being established to the second DN is temporarily prohibited.

Further, the 51st identification information may be information indicating that PDU session establishment to connect to the second DN is prohibited in the cell and/or TA to which the UE_A 10 is currently connected, or may be information indicating that changing the connection destination of the PDU session being established to the second DN is prohibited.

Note that the 51st identification information may include significance of one or more pieces of identification information of 52nd identification information to 56th identification information. Furthermore, each piece of information indicated by the 51st identification information, the information indicated by the 51st identification information, and/or the 52nd identification information to the 56th identification information may be a single piece of identification information. In other words, the 51st identification information together with any one piece of identification information of the 52nd identification information to the 56th identification information may be a single piece of identification information including significance of each piece of identification information.

Therefore, the 51st identification information and the 52nd identification information may be included in the control message as a single piece of identification information having significance of both two pieces of identification information. The 51st identification information and 53rd identification information may be included in the control message as a single piece of identification information having significance of both two pieces of identification information. Furthermore, the 51st identification information and the 53rd identification information may be included in the control message as a single piece of identification information having significance of both two pieces of identification information. The 51st identification information and 54th identification information may be included in the control message as a single piece of identification information having significance of both two pieces of identification information. Furthermore, the 51st identification information and the 56th identification information may be included in the control message as a single piece of identification information having significance of both two pieces of identification information.

The 52nd identification information is information indicating the DNN. The 52nd identification information may be information indicating that the connection destination of the PDU session established or changed by the present procedure cannot be configured to the DN identified by the DNN indicated by the identification information, or may indicate that the connection destination of the PDU session cannot be configured to the second DN. Further, the 52nd identification information may include information indicating whether each DNN is the second DN.

In addition, the 52nd identification information may be information indicating that the PDU session to connect to the second DN cannot be established, may be information indicating that the connection destination of the PDU session cannot be changed to the second DN, or may be information indicating that the PDU session established or changed by the present procedure cannot be configured to the PDU session used in the user data communication performed on the second DN.

Note that the 52nd identification information and the 51st identification information may be a single piece of identification information including significance of each piece of identification information. Therefore, in a case that the present embodiment has description that the 52nd identification information and the 51st identification information are transmitted or included in the control message, the two pieces of identification information may be transmitted or included in the control message as a single piece of identification information having each significance.

The 53rd identification information is information indicating that a requested PDU session ID is inappropriate. The 53rd identification information may be information indicating that the PDU session identified by the PDU session ID indicated by the identification information cannot be established or changed, or may indicate that a new connection destination of the PDU session identified by the PDU session ID indicated by the identification information cannot be configured to the second DN.

In addition, the 53rd identification information may be information indicating that the PDU session to connect to the second DN cannot be established, may be information indicating that the connection destination of the PDU session cannot be changed to the second DN, or may be information indicating that the PDU session established or changed by the present procedure cannot be configured to the PDU session used in the user data communication performed on the second DN.

Note that the 53rd identification information and the 51st identification information may be a single piece of identification information including significance of each piece of identification information. Therefore, in a case that the present embodiment has description that the 53rd identification information and the 51st identification information are transmitted or included in the control message, the two pieces of identification information may be transmitted or included in the control message as a single piece of identification information having each significance.

The 54th identification information is information indicating that a requested PDU session type is inappropriate. The 54th identification information may be information indicating that a requested address is inappropriate. Furthermore, the 54th identification information may be information indicating that the PDU session type of the PDU session established or changed by the present procedure cannot be configured to the PDU session type indicated by the identification information, or may be information indicating that the address correlated to the PDU session established or changed by the present procedure cannot be configured to an address indicated by the identification information and/or an address of the PDU session type indicated in the present embodiment.

Furthermore, the 54th identification information may be information indicating that the PDU session type of the address used in the user data communication performed on the second DN cannot be configured to the PDU session type indicated by the identification information, or may be information indicating that the address used in the user data communication performed on the second DN cannot be configured to an address indicated by the identification information and/or the address of the PDU session type indicated in the present embodiment.

In addition, the 54th identification information may be information indicating that the PDU session to connect to the second DN cannot be established, may be information indicating that the connection destination of the PDU session cannot be changed to the second DN, or may be information indicating that the PDU session established or changed by the present procedure cannot be configured to the PDU session used in the user data communication performed on the second DN.

Note that the 54th identification information and the 51st identification information may be a single piece of identification information including significance of each piece of identification information. Therefore, in a case that the present embodiment has description that the 54th identification information and the 51 st identification information are transmitted or included in the control message, the two pieces of identification information may be transmitted or included in the control message as a single piece of identification information having each significance.

55th identification information is information indicating that a requested TFT is inappropriate. The 55th identification information may be information indicating that the TFT correlated to the PDU session established or changed by the present procedure cannot be configured to the TFT indicated by the identification information, or may be information indicating that the TFT used in the user data communication performed on the second DN cannot be configured to the TFT indicated by the identification information.

In addition, the 55th identification information may be information indicating that PDU session to connect to the second DN cannot be established, may be information indicating that the connection destination of the PDU session cannot be changed to the second DN, or may be information indicating that the PDU session established or changed by the present procedure cannot be configured to the PDU session used in the user data communication performed on the second DN.

Note that the 55th identification information and the 51st identification information may be a single piece of identification information including significance of each piece of identification information. Therefore, in a case that the present embodiment has description that the 55th identification information and the 51st identification information are transmitted or included in the control message, the two pieces of identification information may be transmitted or included in the control message as a single piece of identification information having each significance.

56th identification information is information indicating the value of the first timer. The UE_A 10 may configure a value indicated by the 56th identification information to the first timer based on the reception of the 56th identification information or may start running the first timer.

61st identification information may be information indicating a request for transmission of the Local Area Data Network (LADN) information and/or UE capability information indicating that, in a case that the UE enters a specific location where the connection to the LADN is possible, the PDU session establishment procedure to the LADN can be performed in a UE-initiated manner. The 61st identification information may be a LADN DNN to identify the LADN or may be Single Network Slice Selection Assistance information (S-NSSAI) to identify a network slice (NS) used for the LADN.

Here, the LADN is a DN to which the UE can be connected only at a specific location and provides connectivity to the specific DNN (that is, the LADN DNN). Note that the LADN may be the second DN (that is, the DN_B 105).

Note that in a case that the 61st identification information is transmitted in the Registration Procedure, although the 61st identification information is preferably included in the Registration Request and transmitted, the 61st identification information may be transmitted in any control message other than the Registration Request (for example, a NAS messages or an RRC message). Even after the completion of the registration procedure, the 61st identification information may be transmitted at any timing in any control message (for example, the NAS message or the RRC message).

62nd identification information is LADN information indicating a specific LADN available for the UE based on an operator policy and subscriber information (subscription information). The LADN information may include the LADN DNN and LADN service area information. The LADN service area information may be provided for a set of tracking areas.

Note that, in a case that the 62nd identification information is transmitted in the Registration Procedure, the 62nd identification information is preferably transmitted in response to the Registration Request, for example, in the Registration Accept. The 62nd identification information may be transmitted by any control message other than the Registration Accept (for example, a NAS message or an RRC message). Even after the completion of the registration procedure, the 62nd identification information may be transmitted at any timing in any control message (for example, the NAS message or the RRC message).

63rd identification information may be information indicating whether to transmit information (priority information) indicating a Preference (Prf) of a route to the DN.

Note that in a case that the 63rd identification information is transmitted in the Registration Procedure, although the 63rd identification information is preferably included in the Registration Request and transmitted, the 63rd identification information may be transmitted in any control message other than the Registration Request (for example, the NAS message or the RRC message). Additionally, in a case that the 63rd identification information is transmitted in the PDU Session Establishment Procedure, although the 63rd identification information is preferably transmitted included in the PDU Session Establishment Request, the 63rd identification information may be transmitted in any control message other than the PDU Session Establishment Request (for example, the NAS message or the RRC message). Even after the registration procedure and/or the PDU session establishment procedure is completed, the 63rd identification information may be transmitted at any timing in any control message (for example, the NAS message or the RRC message). Here, specific route preference information may be 64th identification information described below.

The 64th identification information may be information indicating the preference of the route. A value of the Preference can include High, Medium, Low, and Reserved.

Additionally, the preference of the route may be information for selecting a default route. More specifically, the preference may be information for selecting a default router. For example, in a case that the default router and Preference information are stored for each PDU session, the default router correlated to the Preference information having a high priority level may be selected to transmit data. In this way, by selecting the default router, the default route may be selected.

Note that the preference information may be information correlated to the default router and/or the default route and/or an IPv6 network prefix. Accordingly, different priorities may be configured to each default router and/or each default route and/or each IPv6 network prefix.

Note that the 64th identification information is preferably transmitted as Router Advertisement (RA) information. Furthermore, the 64th identification information may be transmitted in response to the Registration Request transmitted in the Registration Procedure, for example, in Registration Accept. The 64th identification information may be transmitted in any control message other than the Registration Accept (for example, the NAS message or the RRC message). Even after the registration procedure is completed, the 63rd identification information may be transmitted at any timing in any control message (for example, the NAS message or the RRC message).

65th identification information may be information indicating that a transmission request of the LADN information is allowed and/or network capability information indicating that, in a case that the UE enters a specific location where the connection to the LADN is possible, the PDU session establishment procedure to the LADN can be performed in a UE-initiated manner. Furthermore, the 65th identification information may be transmitted as a response to the 61st identification information.

Note that in a case that the 65th identification information is transmitted in the Registration Procedure, the 65th identification information is preferably transmitted in response to the Registration Request, for example, in the Registration Accept. The 65th identification information may be transmitted by any control message other than the Registration Accept (for example, the NAS message or the RRC message). Even after the registration procedure is completed, the 65th identification information may be transmitted at any timing in any control message (for example, the NAS message or the RRC message).

66th identification information may be information indicating the request for transmission of the Local Area Data Network (LADN) information and/or the UE capability information indicating that the PDU session establishment procedure to the LADN can be performed in a network-initiated manner in a case that the UE enters a specific location where the connection to LADN is possible. Additionally, the 66th identification information may be the LADN DNN to identify the LADN or may be Single Network Slice Selection Assistance information (S-NSSAI) to identify a network slice (NS) used for the LADN. Here, the LADN is a DN to which the UE is connectable only at a specific location and provides connectivity to the specific DNN (that is, the LADN DNN). Note that the LADN may be the second DN (that is, the DN_B 105).

The 66th identification information may include the 61st identification information. The 66th identification information may be configured as information including significance of both the 61st identification information and the 66th identification information.

Note that in a case that the 66th identification information is transmitted in the Registration Procedure, although the 66th identification information is preferably included in the Registration Request and transmitted, the 66th identification information may be transmitted in any control message other than the Registration Request (for example, the NAS message or the RRC message). Even after the completion of the registration procedure, the 66th identification information may be transmitted at any timing in any control message (for example, the NAS message or the RRC message.

67th identification information may be information indicating that the transmission request of the LADN information is allowed and/or the network capability information indicating that the PDU session establishment procedure to the LADN can be performed in a network-initiated manner in a case that the UE enters a specific location where the connection to the LADN is possible. The 67th identification information may be transmitted as a response to the 66th identification information.

Note that in a case that the 67th identification information is transmitted in the Registration Procedure, the 67th identification information is preferably transmitted in response to the Registration Request, for example, in the Registration Accept. The 65th identification information may be transmitted by any control message other than the Registration Accept (for example, the NAS message or the RRC message). Even after the completion of the registration procedure, the 67th identification information may be transmitted at any timing in any control message (for example, the NAS message or the RRC message.

Figure 8:
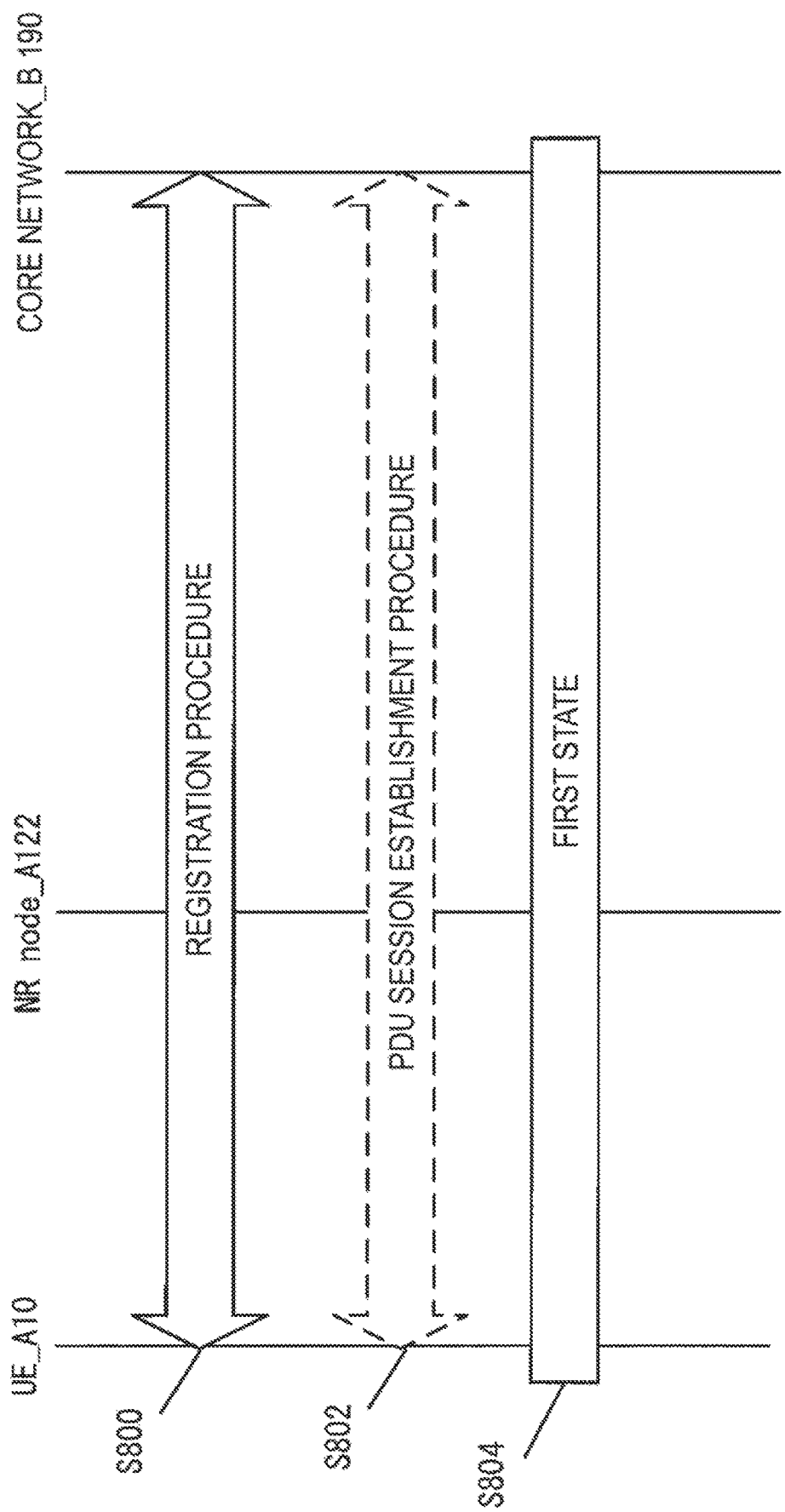
FIG. 8 is a diagram illustrating an initial procedure.

Next, the initial procedure according to the present embodiment will be described with reference to FIG. 8. Hereinafter, the initial procedure is also referred to as the present procedure, and the initial procedure (the present procedure) includes the Registration procedure and the PDU session establishment procedure. Details of the registration procedure and the PDU session establishment procedure will be described later.

Specifically, by performing the registration procedure by each apparatus (S800), the UE_A 10 transitions to a state registered with the network (RM-REGISTERED state). Next, by performing the PDU session establishment procedure by each apparatus (S802), the UE_A 10 establishes the PDU session with the DN_A 5 that provides the PDU connection service via the core network_B 190 and transitions to the first state (S804). The present procedure is then completed.

Note that each apparatus may exchange various pieces of capability information and/or various pieces of request information of each apparatus in the registration procedure and/or the PDU session establishment procedure. Note that in a case that each apparatus performs the exchange of various pieces of information and/or negotiation of various requests in the registration procedure, each apparatus need not perform the exchange of various pieces of information and/or the negotiation of various requests in the PDU session establishment procedure. In a case that each apparatus does not perform the exchange of various pieces of information and/or the negotiation of various requests in the registration procedure, each apparatus may perform the exchange of various pieces of information and/or the negotiation of various requests in the PDU session establishment procedure. Even in a case that each apparatus performs the exchange of various pieces of information and/or the negotiation of various requests in the registration procedure, each apparatus may perform the exchange of various pieces of information and/or the negotiation of various requests in the PDU session establishment procedure.

Each apparatus may perform the PDU session establishment procedure in the registration procedure, or may perform the PDU session establishment procedure after the completion of the registration procedure. In a case that the PDU session establishment procedure is performed in the registration procedure, a PDU session establishment request message may be included in a registration request message and transmitted and/or received, the PDU session establishment accept message may be included in a registration accept message and transmitted and/or received, the PDU session establishment complete message may be included in a registration complete message and transmitted and/or received, and a PDU session establishment reject message may be included in a registration reject message and transmitted and/or received. In a case that the PDU session establishment procedure is performed in the registration procedure, each apparatus may establish the PDU session based on the completion of the registration procedure, or may transition to the first state.

Each apparatus involved in the present procedure may transmit and/or receive each control message described in the present procedure to transmit and/or receive one or more pieces of identification information included in each control message, and may store each piece of transmitted and/or received identification information as a context.

1.3.1. Overview of Registration Procedure

First, the following describes the overview of the registration procedure. The registration procedure is a procedure for registration with the network (the access network, and/or the core network_B 190, and/or the DN (DN_A 5 or DN_B 105)) initiated by the UE_A 10. In a state in which the UE_A 10 is not registered with the network, the UE_A 10 can perform the present procedure at any timing such as a power supply being turned on. In other words, the UE_A 10 may initiate the present procedure at any timing as long as in a deregistered state (RM-DEREGISTERED state). Each apparatus may transition to a registered state (RM-REGISTERED state), based on the completion of the registration procedure.

Moreover, the present procedure may be a procedure to update location registration information of the UE_A 10 in the network, and/or to notify the network of the state of the UE_A 10 periodically by the UE_A 10, and/or to update specific parameters related to the UE_A 10 in the network.

The UE_A 10 may initiate the present procedure in a case that the UE_A 10 performs mobility across TAs. In other words, the UE_A 10 may initiate the present procedure in a case that the UE_A 10 moves to a TA different from a TA indicated in the held TA list. Furthermore, the UE_A 10 may initiate the present procedure in a case that the performed timer expires. Furthermore, the UE_A 10 may initiate the present procedure in a case that a context of each apparatus needs to be updated due to a disconnection or invalidation of the PDU session. Furthermore, the UE_A 10 may initiate the present procedure in a case that a change occurs in capability information and/or preference concerning PDU session establishment of the UE_A 10. Furthermore, the UE_A 10 may initiate the present procedure regularly. Note that, not limited to these timings, the UE_A 10 can perform the present procedure at any timing in a state that the PDU session has been established.

1.3.1.1. Example of Registration Procedure

Figure 9:
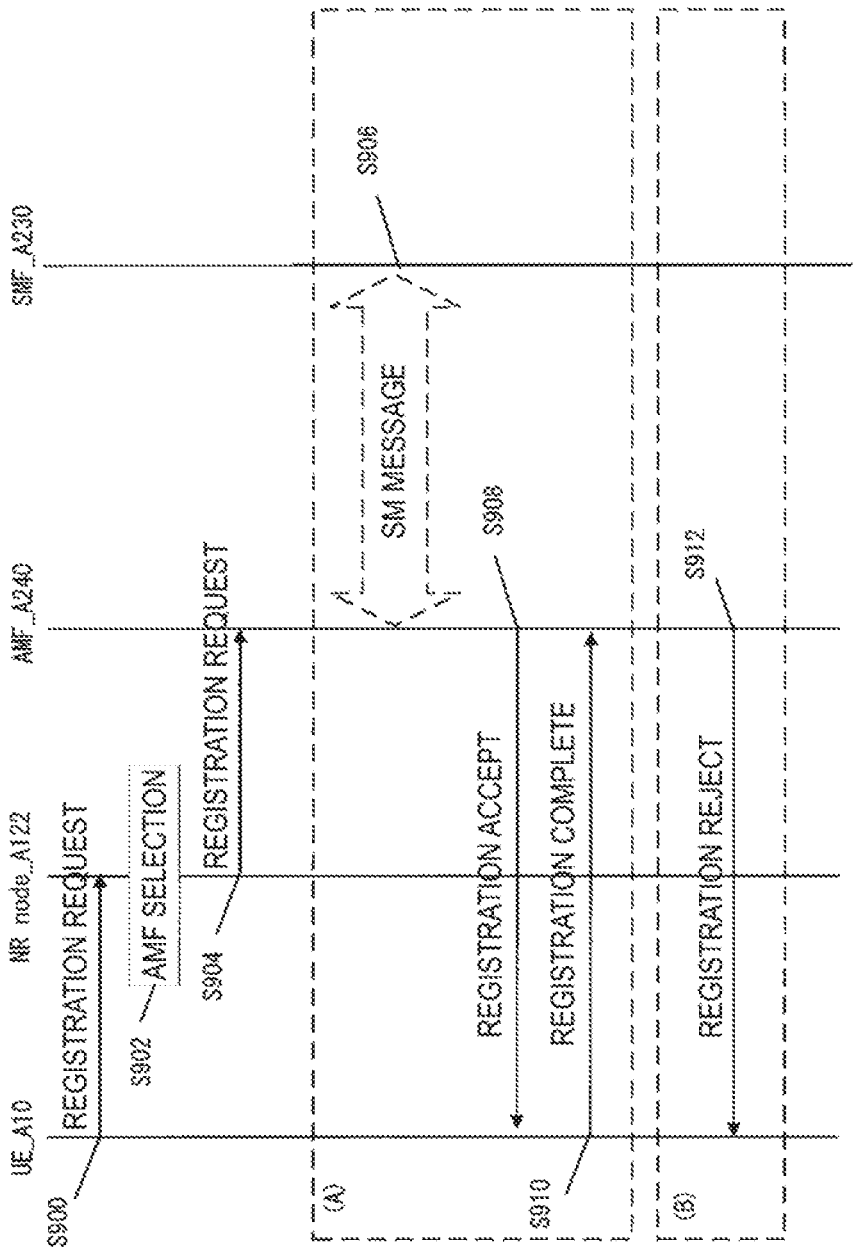
FIG. 9 is a diagram illustrating a registration procedure.

The following describes an example of a procedure to perform the registration procedure with reference to FIG. 9. The present procedure hereinafter refers to the registration procedure. Each step of the present procedure will be described below.

First, the UE_A 10 transmits a Registration Request message to the AMF_A 240 via a NR node_A 122 (S900), (S902), and (S904) to initiate the registration procedure. The UE_A 10 may transmit a registration request message including the Session Management (SM) message (for example, the PDU session establishment request message) or transmit the SM message (for example, the PDU session establishment request message) together with the registration request message to initiate the procedure for the SM, such as the PDU session establishment procedure, during the registration procedure.

Specifically, the UE_A 10 transmits an RRC message including the registration request message to the NR node_A 122 (S900). In a case that the NR node_A 122 receives the RRC message including the registration request message, the NR node_A 122 selects the AMF_A 240 as an NF or a common CP function of a routing destination for the registration request message (S902). The NR node_A 122 retrieves the registration request message from the received RRC messages and transmits or forwards the registration request message to the selected AMF_A 240 (S904). Here, the NR node_A 122 may select the AMF_A 240 based on the information included in the RRC message. Furthermore, the registration request message may be a Non-Access-Stratum (NAS) message transmitted and/or received on the N1 interface. The RRC message may be a control message transmitted and/or received between the UE_A 10 and the NR node_A 122. The NAS message may be processed in a NAS layer, the RRC message may be processed in an RRC layer, and the NAS layer may be a layer higher than the RRC layer.

Additionally, in a case that there are multiple NSIs requesting the registration are present, the UE_A 10 may transmit the registration request message for each NSI, or may transmit multiple registration request messages included in one or more RRC messages. The multiple registration request messages described above may be included in one or more RRC messages and transmitted as one registration request message.

Here, the UE_A 10 may include the 1st identification information and/or the 61st identification information and/or the 63rd identification information and/or the 66th identification information in the registration request message and/or the RRC message.

In addition, the UE_A 10 may transmit the 1st identification information to indicate that the UE_A 10 supports and/or allows the connection to the second DN, or to indicate that the UE_A 10 support and/or allows the PDU session establishment to connect to the second DN.

Note that the UE_A 10 may determine whether the 1st identification information is included in the registration request message, based on the capability information of the UE_A 10, and/or a policy such as a UE policy, and/or a preference of the UE_A 10.

The UE_A 10 may transmit the 61st identification information to indicate a request for the transmission of the LADN information, and/or may indicate that the PDU session establishment procedure to the LADN can be performed (has a capability of performing) in a case that the UE_A 10 enters a specific location where the connection to the LADN is possible.

Additionally, the UE_A 10 may transmit the 63rd identification information to indicate whether to transmit the preference of the route to the DN_A 5.

The UE_A 10 may transmit the 66th identification information to indicate the request for transmission of the LADN information, and/or may indicate that the UE_A 10 has a capability corresponding to the PDU session establishment procedure to the LADN in a network-initiated manner in a case that the UE_A 10 enters a specific location where the connection to the LADN is possible.

The UE_A 10 may include these pieces of identification information in a control message different from the registration request message (for example, the NAS message or the RRC message) to transmit the identification information.

The AMF_A 240 receives the registration request message and/or the control message different from the registration request message, and performs a first condition determination. The first condition determination is to determine whether the network accepts the request of the UE_A 10. In a case that the first condition determination is true, the AMF_A 240 initiates a procedure of (A) in the present procedure. In a case that the first condition determination is false, the AMF_A 240 initiates a procedure of (B) in the present procedure.

Each step of the procedure of (A) in the present procedure will be described below. The AMF_A 240 performs a fourth condition determination, and initiates the procedure of (A) in the present procedure. The fourth condition determination is to determine whether the AMF_A 240 transmits and/or receives the SM message to/from the SMF_A 230. In a case that the fourth condition determination is true, the AMF_A 240 selects the SMF_A 230 and transmits and/or receives the SM message to/from the selected SMF_A 230. In a case that the fourth condition determination is false, the AMF_A 240 omits these (S906). In addition, the AMF_A 240 transmits the Registration Accept message to the UE_A 10 via the NR node_A 122 based on the reception of the registration request message from the UE_A 10 and/or the completion of the transmission and/or reception of the SM message to/from the SMF_A 230 (S908).

Note that in a case that the AMF_A 240 receives the SM message indicating the rejection from the SMF_A 230, the AMF_A 240 may halt the procedure of (A) in the present procedure and initiate the procedure of (B) in the present procedure. Here, the registration accept message may be included in the control message on the N2 interface and the RRC message to be transmitted and/or received. Furthermore, the registration accept message may be a NAS message transmitted and/or received on the N1 interface. The registration accept message may be a response message to the registration request message.

Further, in a case that the fourth condition determination is true, the AMF_A 240 may include the SM message, such as the PDU session establishment accept message (for example, the PDU session establishment accept message), in the registration accept message and transmit the message, or may transmit the SM message, such as the PDU session establishment accept message (for example, the PDU session establishment accept message), together with the registration accept message. The transmission method may be performed in a case that the SM message (for example, the PDU session establishment request message) is included in the registration request message and the fourth condition determination is true. The transmission method may be performed in a case that the SM message (for example, the PDU session establishment request message) is included together with the registration request message and the fourth condition determination is true. The AMF_A 240 may perform such a transmission method to indicate that the procedure for the SM has been accepted.

The AMF_A 240 may include the 11th identification information to the 14th identification information, and/or the 62nd identification information and/or the 65th identification information, and/or the 67th identification information in the registration accept message, or may indicate that the request of the UE_A 10 has been accepted by including these pieces of identification information.

Note that the AMF_A 240 may determine whether to include the 11th identification information to the 14th identification information and/or the 62nd identification information, the 65th identification information, and/or the 67th identification information in the registration accept message based on the received identification information, and/or the capability information of network, and/or the operator policy, and/or the network state, and/or registration information of a user (user subscription), or the like. For example, the 62nd identification information and/or the 65th identification information may be information transmitted to the UE_A 10 in a case that the 61st identification information is received from the UE_A 10. Additionally, the 67th identification information may be information transmitted to the UE_A 10 in a case that the 66th identification information is received from the UE_A 10.

The UE_A 10 receives the registration accept message via the NR node_A 122 (S908). The UE_A 10 receives the registration accept message to recognize contents of various kinds of identification information included in the registration accept message.

For example, by inclusion of the 62nd identification information in the registration accept message, the UE_A 10 may recognize the content of the LADN information and may recognize that the PDU session establishment procedure to the LADN can be performed in a case that the UE_A 10 moves to a specific location. By non-inclusion of the 62nd identification information in the registration accept message, the UE_A 10 may recognize that the PDU session establishment procedure to the LADN cannot be performed in a case that the UE_A 10 moves to the specific location.

For example, by inclusion of the 65th identification information in the registration accept message, the UE_A 10 may recognize that the network side allows the transmission request of the LADN information, and/or the network side has a capability to perform the PDU session establishment procedure to the LADN in a UE-initiated manner in a case that the UE enters a specific location where the connection to the LADN is possible. Additionally, by non-inclusion of the 65th identification information in the registration accept message, the UE_A 10 may recognize that the network side does not allow the transmission request of the LADN information, and/or the network side does not have the capability to perform the PDU session establishment procedure to the LADN in a UE-initiated manner in a case that the UE enters the specific location where the connection to the LADN is possible.

For example, by inclusion of the 67th identification information in the registration accept message, the UE_A 10 may recognize that the network side allows the transmission request of the LADN information, and/or the network side has the capability to perform the PDU session establishment procedure to the LADN in a network-initiated manner in a case that the UE enters the specific location where the connection to the LADN is possible. Additionally, by non-inclusion of the 67th identification information in the registration accept message, the UE_A 10 may recognize that the network side does not allow the transmission request of the LADN information, and/or the network side does not have the capability to perform the PDU session establishment procedure to the LADN in a network initiated manner in a case that the UE enters the specific location where the connection to the LADN is possible.

The UE_A 10 may further transmit a Registration Complete message to the AMF_A 240 (S910). Note that in a case that the UE_A 10 receives the SM message, such as the PDU session establishment accept message, the UE_A 10 may transmit the registration complete message including the SM message, such as the PDU session establishment complete message, or may indicate the completion of the procedure for the SM through the inclusion of the SM message. Here, the registration complete message may be a NAS message transmitted and/or received on the N1 interface. The registration complete message may be a response message to the registration accept message. Further, the registration complete message may be included in the RRC message and the control message on the N2 interface and transmitted and/or received.

The AMF_A 240 receives the registration complete message (S910). Each apparatus completes the procedure of (A) in the present procedure based on the transmission and/or reception of the registration accept message and/or the registration complete message.

Next, each step of the procedure of (B) in the present procedure will be described. The AMF_A 240 transmits the Registration Reject message to the UE_A 10 via the NR node_A 122 (S912) to initiate the procedure of (B) in the present procedure. Furthermore, the UE_A 10 receives the registration reject message or does not receive the registration accept message to recognize that the request of the UE_A 10 has been rejected. Each apparatus completes the procedure of (B) in the present procedure, based on transmission and/or reception of the registration reject message.

Note that, in a case that the fourth condition determination is true, the AMF_A 240 may transmit the registration reject message including the SM message meaning the rejection, such as the PDU session establishment reject message, or may include the SM message meaning the rejection to indicate that the procedure for the SM has been rejected. In that case, the UE_A 10 may further receive the SM message meaning the rejection, such as the PDU session establishment reject message, or may recognize that the procedure for the SM has been rejected.

Furthermore, the registration reject message may be a NAS message transmitted and/or received on the N1 interface. The registration reject message only need to be a response message to the registration request message. Further, the registration reject message transmitted by the AMF_A 240 is not limited to this as long as it is a message rejecting the request of the UE_A 10. Further, the registration reject message may be included in the control message on the N2 interface and the RRC message and transmitted and/or received.

The AMF_A 240 may include one or more pieces of identification information among the 21st identification information and the 22nd identification information in the registration reject message, or may include these pieces of identification information to indicate that the request of the UE_A 10 has been rejected.

The UE_A 10 receives the registration reject message to recognize the contents of various kinds of identification information included in the registration reject message. Specifically, the UE_A 10 may receive the registration reject message to recognize that the PDU session establishment procedure to the LADN cannot be performed in a case that the UE_A 10 moves to the specific location.

Note that the AMF_A 240 may determine which piece of identification information among the 21st identification information and the 22nd identification information is included in the registration reject message, based on the received identification information, and/or the capability information of the network, and/or the policy such as the operator policy, and/or the state of the network.

Each apparatus completes the present procedure (registration procedure), based on the completion of the procedure of (A) or (B) in the present procedure. Note that each apparatus may transition to a state in which the UE_A 10 is registered with the network (RM_REGISTERED state) based on the completion of the procedure of (A) in the present procedure, or may maintain a state in which the UE_A 10 is not registered with the network (RM_DEREGISTERED state) based on the completion of the procedure of (B) in the present procedure. Transition to each state of each apparatus may be performed based on completion of the present procedure, or may be performed based on an establishment of a PDU session.

Furthermore, each apparatus may perform processing based on identification information transmitted and/or received in the present procedure, based on completion of the present procedure. For example, in a case that the UE_A 10 receives the 11th identification information, the UE_A 10 may recognize that the connection to the second DN is allowed and/or supported. Further, in a case that the UE_A 10 receives the 11th identification information, the UE_A 10 may initiate the PDU session establishment procedure to establish the PDU session to connect to the second DN.

In a case that the UE_A 10 receives the 12th identification information and/or the 13th identification information, the UE_A 10 may recognize restrictions on some functions. For example, in a case that the UE_A 10 receives the 12th identification information, the UE_A 10 may be prohibited from initiating the PDU session establishment procedure performed to establish the PDU session to connect to the second DN in the currently connected cell and/or TA, or may be prohibited from transmitting the PDU session establishment request message indicating the request of the PDU session establishment to connect to the second DN in the currently connected cell and/or TA.

Further, in a case that the UE_A 10 receives the 12th identification information and/or the 13th identification information, the UE_A 10 may be temporarily prohibited from initiating the PDU session establishment procedure performed to establish the PDU session to connect to the second DN, or may be temporarily prohibited from transmitting the PDU session establishment request message indicating the request of the PDU session establishment to connect to the second DN.

Furthermore, in a case that the UE_A 10 receives the 12th identification information and/or the 13th identification information, the UE_A 10 may configure the value indicated by the 13th identification information as the value of the first timer, or may start running the first timer. In addition, the UE_A 10 may be prohibited from initiating the PDU session establishment procedure performed to establish the PDU session to connect to the second DN until the first timer expires, or may be prohibited from transmitting the PDU session establishment request message indicating the request of the PDU session establishment to connect to the second DN until the first timer expires.

In addition, in a case that the UE_A 10 receives the registration accept message including the 12th identification information and/or the 13th identification information, the UE_A 10 need not to initiate the PDU session establishment procedure performed to establish the PDU session to connect to the second DN, or need not to transmit the PDU session establishment request message indicating the request of the PDU session establishment to connect to the second DN. In other words, in a case that the UE_A 10 receives the registration accept message not including the 12th identification information and/or the 13th identification information, the UE_A 10 may initiate the PDU session establishment procedure performed to establish the PDU session to connect to the second DN, or may transmit the PDU session establishment request message indicating the request of the PDU session establishment to connect to the second DN.

Further, in a case that the UE_A 10 receives the 14th identification information, the UE_A 10 may initiate the PDU session establishment procedure performed to establish the PDU session to connect to the second DN using the DNN indicated by the 14th identification information after completion of the present procedure, or may transmit the PDU session establishment request message including the DNN indicated by the 14th identification information to the SMF_A 230 via the AMF_A 240 after the completion of the present procedure.

In a case that the UE_A 10 receives the 21st identification information and/or the 22nd identification information, the UE_A 10 may recognize that the request of the UE_A 10 has been rejected or may further recognize a cause why the request has been rejected.

For example, in a case the UE_A 10 receives the 21st identification information, the UE_A 10 may recognize that the network does not support the connection to the second DN, or may recognize that the network does not allow the connection to the second DN. In other words, in a case that the UE_A 10 receives the 21st identification information, the UE_A 10 may be prohibited from initiating the PDU session establishment procedure performed to establish the PDU session to connect to the second DN, or may be prohibited from transmitting the PDU session establishment request message indicating the request for the PDU session establishment to connect to the second DN.

Further, in a case that the UE_A 10 receives the 21st identification information, the UE_A 10 may be prohibited from initiating a new registration procedure performed to connect to the second DN in the currently connected cell and/or TA, or may be prohibited from transmitting the registration request message indicating the request to connect to the second DN in the currently connected cell and/or TA.

Furthermore, in a case that the UE_A 10 receives the 21st identification information and/or the 22nd identification information, the UE_A 10 may configure the value indicated by the 22nd identification information as the value of the second timer, or may start running the second timer. Furthermore, the UE_A 10 may be prohibited from initiating a new registration procedure performed to connect to the second DN until the second timer expires, or may be prohibited from transmitting the registration request message indicating the request to connect to the second DN until the second timer expires.

Furthermore, in a case that the UE_A 10 receives the registration reject message including the 21st identification information and/or the 22nd identification information, the UE_A 10 need not initiate a new registration procedure performed to connect to the second DN or need not transmit a new registration request message indicating the request to connect to the second DN. In other words, in a case that the UE_A 10 receives the registration accept message not including the 21st identification information and/or the 22nd identification information, the UE_A 10 may initiate a new registration procedure performed to connect to the second DN, or may transmit a new registration request message indicating the request to connect to the second DN.

Furthermore, in a case that the UE_A 10 receives one or more pieces of identification information among the 11th identification information to the 14th identification information, information indicated by each piece of the identification information received together with the registration accept message may be stored in a context held by the UE_A 10. Furthermore, in a case that the UE_A 10 receives one or more pieces of identification information among the 21st identification information and the 22nd identification information, the information in the context held by the UE_A 10 may be updated or deleted, or the information indicated by each piece of the identification information received together with the registration reject message may be further stored in the context held by the UE_A 10.

In a case that the UE_A 10 receives the 12th identification information and/or the 22nd identification information, the UE_A 10 may recognize a cause why the request of the UE_A 10 has been rejected. Furthermore, the UE_A 10 may perform the present procedure again, based on the cause why the request of the UE_A 10 has been rejected, or may perform the registration procedure on a core network_A 90 or another cell.

The first condition determination may be performed based on the identification information included in the registration request message, and/or the subscriber information, and/or the operator policy. For example, in a case that the network allows the request of the UE_A 10, the first condition determination may be true. In a case that the network does not allow the request of the UE_A 10, the first condition determination may be false. Furthermore, in a case that the network as the registration destination of the UE_A 10 and/or the apparatus in the network supports a function requested by the UE_A 10, the first condition determination may be true, and in a case that the function is not supported, the first condition determination may be false. Conditions for determining true or false of the first condition determination need not be limited to the above-described conditions.

The fourth condition determination may be performed based on whether the AMF_A 240 has received the SM, and may be performed based on whether the SM message is included in the registration request message. For example, in a case that the AMF_A 240 receives the SM and/or the registration request message includes the SM message, the fourth condition determination may be true, and in a case that the AMF_A 240 does not receive the SM and/or the registration request message does not include the SM message, the fourth condition determination may be false. Conditions for determining the true or false of the fourth condition determination need not be limited to the above-described conditions.

1.3.2. Overview of PDU Session Establishment Procedure

Next, the following describes an overview of the PDU session establishment procedure (also referred to as a first PDU session establishment procedure) performed to establish the PDU session to the DN_A 5. Hereinafter, the PDU session establishment procedure is also referred to as the present procedure. The present procedure is a procedure for each apparatus to establish a PDU session. Note that each apparatus may perform the present procedure in a state in which the registration procedure has been completed, or may perform the present procedure during the registration procedure. Each apparatus may initiate the present procedure in the registered state, or may initiate the present procedure at any timing after the registration procedure. Each apparatus may establish a PDU session, based on completion of the PDU session establishment procedure. Furthermore, each apparatus may perform the present procedure multiple times to establish multiple PDU sessions.

1.3.2.1. Example of PDU Session Establishment Procedure

Figure 10:
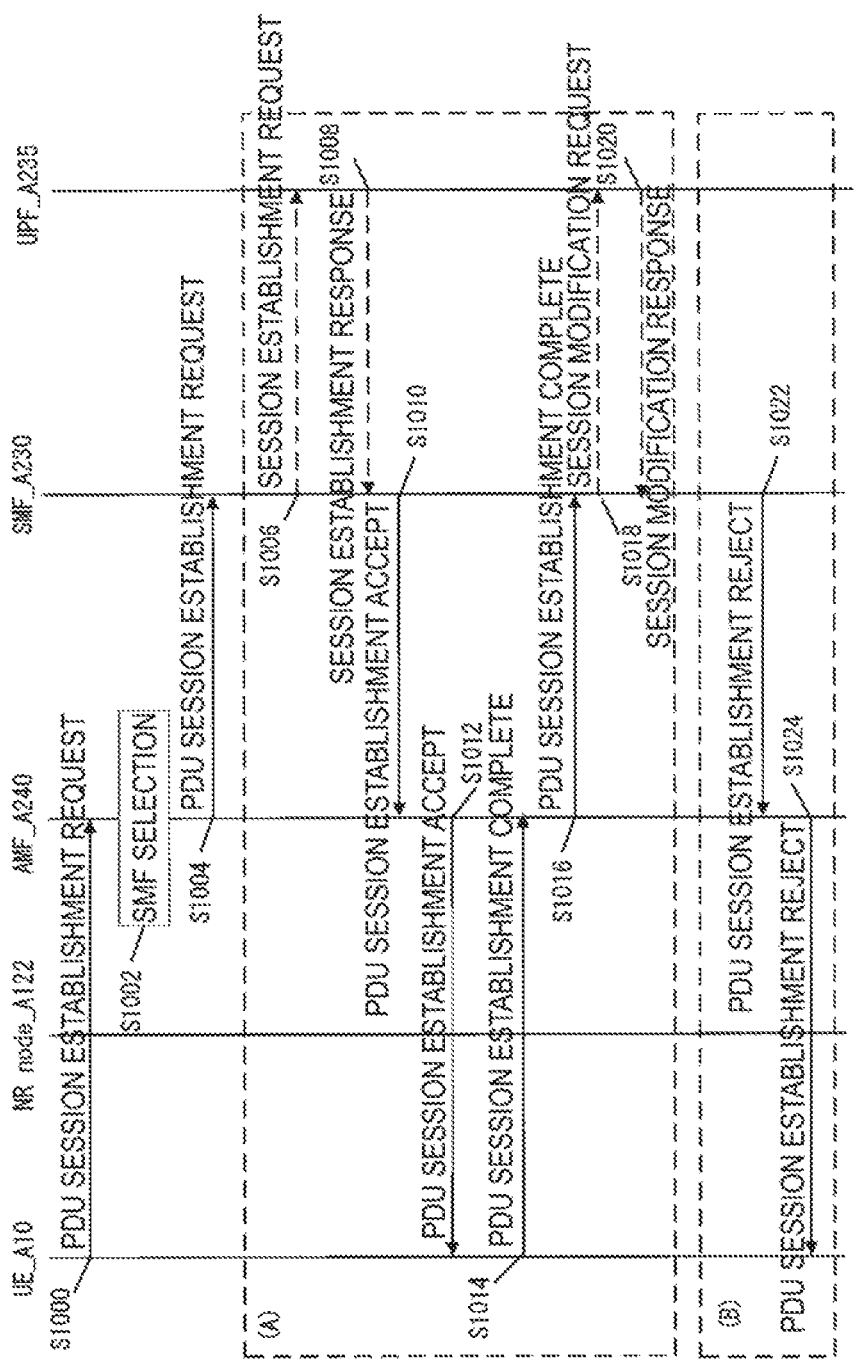
FIG. 10 is a diagram illustrating a PDU session establishment procedure triggered by a UE.

The following describes an example of performing the PDU session establishment procedure (first PDU session establishment procedure) with reference to FIG. 10. Each step of the present procedure will be described below. First, the UE_A 10 transmits the PDU Session Establishment Request message to the SMF_A 230 via the NR node_A 122 and the AMF_A 240 (S1000), (S1002), and (S1004) to initiate the PDU session establishment procedure.

Specifically, the UE_A 10 transmits the PDU session establishment request message to the AMF_A 240 via the NR node_A 122 using the N1 interface (S1000). In a case that the AMF_A 240 receives the PDU session establishment request message, the AMF_A 240 selects the SMF_A 230 as an NF of a routing destination of the PDU session establishment request message (S1002) and transmits or forwards the PDU session establishment request message to the selected SMF_A 230 using the N11 interface (S1004). Here, the AMF_A 240 may select the SMF_A 230 of the routing destination based on the information included in the PDU session establishment request message. More specifically, the AMF_A 240 may select the SMF_A 230 of the routing destination based on each piece of identification information acquired based on the reception of the PDU session establishment request message, and/or the subscriber information, and/or the capability information of the network, and/or the operator policy, and/or the state of the network, and/or the context already held by the AMF_A 240.

The PDU session establishment request message may be a NAS message. The PDU session establishment request message only needs to be a message requesting the PDU session establishment and not limited to this.

Here, the UE_A 10 may include one or more pieces of identification information among the 31st identification information to the 35th identification information and/or the 63rd identification information in the PDU session establishment request message, and/or may indicate the request of the UE_A 10 by including these pieces of identification information.

In addition, the UE_A 10 may transmit one or more pieces of identification information among the 31st identification information to the 35th identification information to request the PDU session establishment to connect to the second DN. More specifically, the UE_A 10 may transmit the 32nd identification information and/or correlate the 31st identification information to the 32nd identification information and transmit the identification information to request the PDU session establishment to connect to the second DN, or to further request to configure the connection destination of the established PDU session to be the DN indicated by the 32nd identification information.

Further, the UE_A 10 may transmit the 33rd identification information and/or correlate the 31st identification information to the 33rd identification information and transmit the identification information to request the PDU session establishment identified by the PDU session ID indicated by the 33rd identification information, or to request to configure the connection destination of the established PDU session to be the second DN.

In addition, the UE_A 10 may transmit the 34th identification information and/or correlate the 31st identification information to the 34th identification information and transmit the identification information to request the PDU session establishment to connect to the second DN, or to further request to configure the PDU session type of the established PDU session to be the PDU session type indicated by the 34th identification information.

In addition, the UE_A 10 may transmit the 34th identification information and/or correlate the 31st identification information to the 34th identification information and transmit the identification information to further request to configure an address used in the user data communication performed on the second DN using the established PDU session to be an address of a type indicated by the 34th identification, or to be the address indicated by the 34th identification information.

In addition, the UE_A 10 may transmit the 35th identification information and/or correlate the 31st identification information to the 35th identification information and transmit the identification information to request the PDU session establishment to connect to the second DN, or to further request to configure the TFT used in the user data communication performed on the second DN using the established PDU session to be the TFT indicated by the 35th identification information.

Note that the UE_A 10 may determine which piece of identification information of the 31st identification information to the 35th identification information is to be included in the PDU session establishment request message, based on the capability information of the UE_A 10, and/or the policy such as the UE policy, and/or the preference of the UE_A 10. Note that the determination performed by the UE_A 10 as to which piece of identification information is to be included in the PDU session establishment request message is not limited to the determination described above.

Additionally, the UE_A 10 may transmit the 63rd identification information to indicate whether to transmit the preference of the route to the DN_A 5.

The SMF_A 230 receives the PDU session establishment request message, and performs the first condition determination. The first condition determination is to determine whether the SMF_A 230 accepts the request of the UE_A 10. In the first condition determination, the SMF_A 230 determines whether the first condition determination is true or false. In a case that the first condition determination is true, the SMF_A 230 initiates the procedure of (A) in the present procedure, and in a case that the first condition determination is false, the SMF_A 230 initiates the procedure of (B) in the present procedure. Note that steps in the case that the first condition determination is false will be described later.

As follows, steps in a case that the first condition determination is true, in other words, each step of the procedure of (A) in the present procedure will be described. The SMF_A 230 selects the UPF_A 235 as the establishment destination of the PDU session, transmits the Session Establishment request message to the selected UPF_A 235 (S1006), and initiates the procedure of (A) in the present procedure.

Here, the SMF_A 230 may select one or more UPFs_A 235 based on each piece of identification information acquired based on the reception of the PDU session establishment request message, and/or the capability information of the network, and/or the subscriber information, and/or the operator policy, and/or the state of the network, and/or the context already held by the SMF_A 230. Note that in a case that multiple UPFs_A 235 are selected, the SMF_A 230 may transmit the session establishment request message to each UPF_A 235.

The UPF_A 235 receives the session establishment request message and creates a context for the PDU session. In addition, the UPF_A 235 transmits the Session Establishment response message to the SMF_A 230 based on the reception of the session establishment request message and/or the creation of the context for the PDU session (S1008). Furthermore, the SMF_A 230 receives a session establishment response message. Note that the session establishment request message and the session establishment response message may be control messages transmitted and/or received on the N4 interface. Further, the session establishment response message may be a response message to the session establishment request message.

Further, the SMF_A 230 may assign an address to be assigned to the UE_A 10 based on the reception of the PDU session establishment request message and/or the selection of the UPF_A 235 and/or the reception of the session establishment response message. Furthermore, the SMF_A 230 may correlate the address assigned to the UE_A 10 to the information indicating that the address is an address used for communication to the second DN. Note that the SMF_A 230 may assign the address to be assigned to the UE_A 10 during the PDU session establishment procedure, or may assign the address after the completion of the PDU session establishment procedure.

Specifically, in a case that the SMF_A 230 assigns the IPv4 address without using the DHCPv4, the SMF_A 230 may assign the address during the PDU session establishment procedure or may transmit the assigned address to the UE_A 10. In addition, in a case that the SMF_A 230 assigns the IPv4 address, and/or the IPv6 address, and/or the IPv6 prefix using the DHCPv4 or the DHCPv6 or Stateless Address Autoconfiguration (SLAAC), the SMF_A 230 may assign the address after the PDU session establishment procedure or may transmit the assigned address to the UE_A 10. Note that the address allocation performed by SMF_A 230 is not limited to these.

Furthermore, based on the completion of the address assignment of the address to be assigned to the UE_A 10, the SMF_A 230 may transmit the assigned address included in the 44th identification information to the UE_A 10, or may correlate information indicating the assigned address to information indicating whether the assigned address is an address that can be used for the user data communication performed with the second DN and transmit the information to the UE_A 10 without including the assigned address in the 44th identification information. In this case, the UE_A 10 may receive the 44th identification information, and/or the information indicating the assigned address, and/or the information indicating whether the assigned address is the address that can be used for the user data communication performed with the second DN, which are transmitted from the SMF_A 230.

The SMF_A 230 transmits the PDU session establishment accept message to the UE_A 10 via the AMF_A 240, based on the reception of the PDU session establishment request message, and/or the selection of the UPF_A 235, and/or the reception of the session establishment response message, and/or the completion of the address assignment of the address to be assigned to the UE_A 10 (S1010) (S1012).

Specifically, the SMF_A 230 transmits the PDU session establishment accept message to the AMF_A 240 using the N11 interface (S1010). The AMF_A 240 that has received the PDU session establishment request message transmits the PDU session establishment accept message to the UE_A 10 using the N1 interface (S1012).

Note that in a case that the PDU session is PDN connection, the PDU session establishment accept message may be a PDN connectivity accept message. Furthermore, the PDU session establishment accept message may be a NAS message transmitted and/or received on the N11 interface and the N1 interface. The PDU session establishment accept message is not limited to the PDU session establishment accept message described above, and only needs to be a message indicating the acceptance of the establishment of the PDU session.

Here, the SMF_A 230 may include one or more pieces of identification information among the 41st identification information to the 45th identification information in the PDU session establishment accept message, or the inclusion of these pieces of identification information may indicate the acceptance of the request of the UE_A 10.

Further, the SMF_A 230 may transmit one or more pieces of identification information among the 41st identification information to the 45th identification information to indicate that the network has accepted the request for the PDU session establishment to connect to the second DN, or to indicate that the PDU session establishment to connect to the second DN has been allowed. More specifically, the SMF_A 230 may transmit the 42nd identification information and/or correlate the 41st identification information to the 42nd identification information and transmit the identification information to indicate that the PDU session to connect to the second DN is established, or to indicate that the connection destination of the PDU session to be established is the DN indicated by the 42nd identification information.

Further, the SMF_A 230 may transmit the 43rd identification information and/or correlate the 41st identification information to the 43rd identification information and transmit the identification information to indicate that the PDU session identified by the PDU session ID indicated by the 43rd identification information is established, or to indicate that the connection destination of the PDU session to be established is the second DN.

In addition, the SMF_A 230 may transmit the 44th identification information and/or correlate the 41st identification information to the 44th identification information and transmit the identification information to indicate that the PDU session to connect to the second DN is established, or to indicate that the address used in the user data communication performed on the second DN using the established PDU session is the address of the PDU session type indicated by the 44th identification information and/or the address indicated by the 44th identification information.

In addition, the SMF_A 230 may transmit the 45th identification information and/or correlate the 41st identification information to the 45th identification information and transmit the identification information to indicate that the PDU session to connect to the second DN is established, or to indicate that the TFT used in the user data communication performed on the second DN using the established PDU session is the TFT indicated by the 45th identification information.

Note that the SMF_A 230 may determine which piece of identification information among the 41st identification information to the 45th identification information is to be included in the PDU session establishment accept message, based on the received identification information, and/or the capability information of the network, and/or the policy such as the operator policy, and/or the state of the network. Note that the determination performed by the SMF_A 230 as to which piece of identification information is to be included in the PDU session establishment accept message is not limited to the determination described above.

The UE_A 10 receives the PDU session establishment accept message, and further transmits the PDU session establishment complete message to the SMF_A 230 via the AMF_A 240 (S1014) (S1016). Furthermore, the SMF_A 230 receives the PDU session establishment complete message, and performs the second condition determination.

Specifically, the UE_A 10 transmits the PDU session establishment complete message to the AMF_A 240 using the N1 interface (S1014). The AMF_A 240 that has received the PDU session establishment complete message transmits the PDU session establishment complete message to the SMF_A 230 using the N11 interface (S1016).

Note that in a case that the PDU session is PDN connection, the PDU session establishment complete message may be a PDN Connectivity complete message, or may be an Activate default EPS bearer context accept message. Furthermore, the PDU session establishment complete message may be a NAS message transmitted and/or received on the N interface and the N11 interface. The PDU session establishment complete message only needs to be a response message to the PDU session establishment accept message. However, the PDU session establishment complete message is not limited to this, and only needs to be a message indicating that the PDU session establishment procedure is completed.

The second condition determination is to determine a type of the message on the N4 interface to be transmitted and/or received. In a case that the second condition determination is true, the SMF_A 230 transmits a Session Modification request message to the UPF_A 235 (S1018). In addition, the SMF_A 230 receives a Session Modification response message transmitted from the UPF_A 235 that has received the Session Modification request message (S1020). In a case that the second condition determination is false, the SMF_A 230 transmits a session establishment request message to the UPF_A 235 (S1018), and further receives the session modification accept message transmitted from the UPF_A 235 that has received the session establishment request message (S1020).

Note that after receiving the PDU session establishment accept message from the AMF_A 240, the UE_A 10 may transmit a Router Solicitation (RS) (hereinafter also referred to as a first RS) to the core network to configure the IPv6 address and/or to obtain the IPv6 prefix, and/or to obtain a Router Advertisement (RA) (hereinafter also referred to as a first RA). Here, the first RS transmitted from the UE_A 10 may be transmitted to the SMF_A 230 via the UPF_A 235. For example, in a case that the UPF_A 235 receives the first RS transmitted from the UE_A 10, the UPF_A 235 may select the SMF_A 230 associated with the PDU session among multiple SMFs connected to the UPF and transmit the first RS to the selected SMF_A 230. The SMF selection by the UPF may be performed using the PDU session ID transmitted from the UE or any of the NFs (including the SMF_A 230).

Then, the SMF_A 230 that has received the first RS generates the first RA in a case that the PDU Type of the UE_A 10 is the IPv6 and transmits the first RA to the UE_A 10 via the N4 interface and the UPF_A 235. At this time, the SMF_A 230 may transmit the first RA including the IPv6 prefix and/or the 64th identification information. The 64th identification information may be information to be transmitted only in a case that the 63rd identification information is received.

Note that the first RA may be generated by the UPF_A 235 rather than the SMF_A 230. In this case, since the first RS transmitted from the UE_A 10 is not transmitted to the SMF_A 230 via the UPF_A 235, the UPF does not select the SMF. Specifically, in a case that the PDU Type of the UE_A 10 is IPv6, the UPF_A 235 that has received the first RS from the UE_A 10 generates the first RA and transmits the first RA to the UE_A 10 via the N3 interface.

Further, the first RS and the first RA may periodically be exchanged while the PDU session is being established.

The UE_A 10 can select the UPF_A 235 as the default router to the DN_A 5 by receiving the first RA by any of the above-described methods and configuring the IPv6 address, and can further recognize the preference of the route to the DN_A 5.

Each apparatus completes the procedure of (A) in the present procedure, based on the transmission and/or reception of the PDU session establishment complete message, and/or the transmission and/or reception of a session modification response message, and/or the transmission and/or reception of the session establishment response message, and/or the transmission and/or reception of the RA.

In a case that the procedure of (A) in the present procedure is completed, the UE_A 10 is in a state in which the PDU session to the DN_A 5 has been established, that is, the first state. Although this PDU session is assumed to be established via the access network and the UPF_A 235, but is not limited thereto. That is, a UPF (UPF_C 239) different from the UPF_A 235 may be present between the UPF_A 235 and the access network. At this time, the PDU session is established via the access network, the UPF_C 239, and the UPF_A 235.

Next, each step of the procedure of (B) in the present procedure will be described. The SMF_A 230 transmits the PDU session establishment reject message to the UE_A 10 via the AMF_A 240 (S1022) (S1024), and initiates the procedure of (B) in the present procedure.

Specifically, the SMF_A 230 transmits the PDU session establishment reject message to the AMF_A 240 using the N11 interface (S1022), and the AMF_A 240 that has received the PDU session establishment request message transmits the PDU session establishment reject message to the UE_A 10 using the N1 interface (S1024).

Note that in a case that the PDU session is PDN connection, the PDU session establishment reject message may be a PDN Connectivity reject message. Furthermore, the PDU session establishment reject message may be a NAS message transmitted and/or received on the N11 interface and the N interface. The PDU session establishment reject message is not limited to the PDU session establishment reject message described above, and only needs to be a message indicating that the PDU session establishment has been rejected.

Here, the SMF_A 230 may include one or more pieces of identification information among the 51st identification information to the 56th identification information in the PDU session establishment reject message, or may indicate that the request of the UE_A 10 has been rejected by including these pieces of identification information.

Further, the SMF_A 230 may transmit one or more pieces of identification information among the 51st identification information to the 56th identification information to indicate that the network has rejected the request for the PDU session establishment to connect to the second DN, or to indicate that the network does not allow the PDU session establishment to connect to the second DN. Further, the SMF_A 230 may transmit one or more pieces of identification information among the 51st identification information to the 56th identification information to indicate that the PDU session to connect to the second DN has not been established.

For example, the SMF_A 230 may transmit the 51st identification information to indicate that the connection to the second DN is temporarily prohibited, or to indicate that the connection to the second DN is prohibited in the cell and/or TA to which the UE_A 10 is currently connected.

In addition, the SMF_A 230 may transmit the 52nd identification information to indicate that the DNN indicated by the 32nd identification information is inappropriate in establishing the PDU session to connect to the second DN, or to indicate that the DNN indicated by the 32nd identification information is not the DNN indicating the second DN.

In addition, the SMF_A 230 may transmit the 53rd identification information to indicate that the PDU session ID indicated by the 33rd identification information is inappropriate in establishing the PDU session to connect to the second DN, to indicate that the PDU session identified by the PDU session ID indicated by the 33rd identification information cannot be established to the second DN, or to indicate that the PDU session ID indicated by the 33rd identification information cannot be used for the PDU session to connect to the second DN.

In addition, the SMF_A 230 may transmit the 54th identification information to indicate that the PDU session type and/or the address indicated by the 34th identification information is inappropriate in establishing the PDU session to connect to the second DN, or to indicate that the address of the PDU session type indicated by the 34th identification information and/or the address indicated by the 34th identification information cannot be used for the user data communication performed on the second DN.

In addition, the SMF_A 230 may transmit the 55th identification information to indicate that the TFT indicated by the 35th identification information is inappropriate in establishing the PDU session to connect to the second DN, or to indicate that the TFT indicated by the 35th identification information cannot be used for the user data communication performed on the second DN.

In addition, the SMF_A 230 may transmit the 51st identification information and/or the 56th identification information to indicate that the UE_A 10 is prohibited from retransmitting the PDU session establishment request message for a certain period of time, or to indicate a period during which the UE_A 10 is prohibited from retransmitting the PDU session establishment request message. Furthermore, the SMF_A 230 may transmit the 56th identification information to indicate that the first timer is started, or to indicate that the value indicated by the 56th identification information is configured as the value of the first timer.

Note that the SMF_A 230 may determine which piece of identification information among the 51st identification information to the 56th identification information is to be included in the PDU session establishment reject message, based on the received identification information, and/or the capability information of the network, and/or the policy such as the operator policy, and/or the state of the network. Note that determination performed by the SMF_A 230 as to which piece of identification information is to be included in the PDU session establishment reject message is not limited to the determination described above.

Each apparatus completes the present procedure, based on completion of the procedure of (A) or (B) in the present procedure. Note that each apparatus may transition to a state in which the PDU session is established, based on the completion of the procedure of (A) in the present procedure. Each apparatus may recognize that the present procedure has been rejected, or may transition to a state in which the PDU session is not established, based on the completion of the procedure of (B) in the present procedure.

Furthermore, each apparatus may perform processing based on identification information transmitted and/or received in the present procedure, based on completion of the present procedure. For example, in a case that the UE_A 10 receives one or more pieces of identification information among the 41st identification information to the 45th identification information, the UE_A 10 may recognize the establishment of the PDU session to connect to the second DN, or may recognize that the user data communication on the second DN using the established PDU session can be performed.

Further, the UE_A 10 may recognize that the DN identified by the 42nd identification information is the second DN based on the reception of the 41st identification information and/or the 42nd identification information. Further, the UE_A 10 may recognize that the PDU session identified by the 43rd identification information is the PDU session that can be used in performing the user data communication on the second DN based on the reception of the 41st identification information and/or the 43rd identification information.

Further, the UE_A 10 may recognize that the address of the PDU session type identified by the 44th identification information and/or the address identified by the 44th identification information is an address that can be used in performing the user data communication on the second DN, based on the reception of the 41st identification information and/or the 44th identification information. Further, the UE_A 10 may recognize that the TFT identified by the 45th identification information is a TFT that can be used in the user data communication on the second DN based on the reception of the 41st identification information and/or the 45th identification information.

Further, in a case that the UE_A 10 performs the user data communication on the second DN, the UE_A 10 may use the PDU session identified by the 43rd identification information, may use the address of the PDU session type identified by the 44th identification information, may use the address identified by the 44th identification information, or may use the TFT identified by the 45th identification information.

In other words, in a case that the UE_A 10 receives one or more pieces of identification information among the 41st identification information to the 45th identification information, after the present procedure is completed, the UE_A 10 may perform the user data communication on the DN identified by the 42nd identification information, may perform the user data communication on the second DN using the PDU session identified by the 43rd identification information, may perform the user data communication on the second DN using the address of the PDU session type identified by the 44th identification information and/or the address identified by the 44th identification information, or may perform the user data communication on the second DN using the TFT identified by the 45th identification information.

In a case that the UE_A 10 receives one or more pieces of identification information among the 51st identification information to the 56th identification information, the UE_A 10 may recognize the rejection of the request of the UE_A 10 or may further recognize a cause why the request has been rejected. In addition, the UE_A 10 may perform the present procedure again or may perform the registration procedure on another cell and TA based on the cause why the request has been rejected.

For example, in a case that the UE_A 10 receives the 51st identification information, the UE_A 10 may recognize that the PDU session to connect to the second DN is not established, or may recognize that the PDU session establishment to connect to the second DN is not allowed.

Further, in a case that the UE_A 10 receives the 51st identification information, the UE_A 10 may recognize that the PDU session establishment to connect to the second DN is prohibited in the currently connected cell and/or TA. Further, in a case that the UE_A 10 receives the 51st identification information, the UE_A 10 may be prohibited from initiating a new PDU session establishment procedure performed to establish the PDU session to connect to the second DN in the currently connected cell and/or TA, or may be prohibited from transmitting the PDU session establishment request message indicating the request for the PDU session establishment to connect to the second DN in the currently connected cell and/or TA.

Further, in a case that the UE_A 10 receives the PDU session establishment reject message including the 51st identification information, the UE_A 10 need not initiate a new PDU session establishment procedure performed to establish the PDU session to connect to the second DN in the currently connected cell and/or TA, or need not transmit a new PDU session establishment request message indicating the request for the PDU session establishment to connect to the second DN in the currently connected cell and/or TA. In other words, in a case that the UE_A 10 receives the PDU session establishment reject message not including the 51st identification information, the UE_A 10 may initiate a new PDU session establishment procedure performed to establish the PDU session to connect to the second DN in the currently connected cell and/or TA, or may transmit a new PDU session establishment request message indicating the request for the PDU session establishment to connect to the second DN in the currently connected cell and/or TA.

Further, in a case that the UE_A 10 receives the 52nd identification information, the UE_A 10 may recognize that the PDU session establishment using the DNN indicated by the 32nd identification information is prohibited. Further, in the case that the UE_A 10 receives the 52nd identification information, the UE_A 10 may be prohibited from initiating a new PDU session establishment procedure using the identification information indicating the same DNN as that of the 32nd identification information, or may be prohibited from transmitting a new PDU session establishment request message including the identification information indicating the same DNN as that of the 32nd identification information.

Furthermore, in a case that the UE_A 10 receives the PDU session establishment reject message including the 52nd identification information, the UE_A 10 need not initiate a new PDU session establishment procedure using the identification information indicating the same DNN as that of the 32nd identification information, or need not transmit a new PDU session establishment request message including the identification information indicating the same DNN as that of the 32nd identification information. In other words, in a case that the UE_A 10 receives the PDU session establishment reject message not including the 52nd identification information, the UE_A 10 may initiate a new PDU session establishment procedure using the identification information indicating the same DNN as that of the 32nd identification information, or may transmit a new PDU session establishment request message including the identification information indicating the same DNN as that of the 32nd identification information.

Further, in a case that the UE_A 10 receives the 53rd identification information, the UE_A 10 may recognize that the PDU session establishment using the PDU session ID indicated by the 33rd identification information is prohibited. Further, in the case that the UE_A 10 receives the 53rd identification information, the UE_A 10 may be prohibited from initiating a new PDU session establishment procedure using the identification information indicating the same PDU session ID as that of the 33rd identification information, or may be prohibited from transmitting a new PDU session establishment request message including the identification information indicating the same PDU session ID as that of the 33rd identification information.

Further, in the case of receiving the PDU session establishment reject message including the 53rd identification information, the UE_A 10 need not initiate a new PDU session establishment procedure using identification information indicating the same PDU session ID as that of the 33rd identification information, or need not transmit a new PDU session establishment request message including the identification information indicating the same PDU session ID as that of the 33rd identification information. In other words, in a case that the UE_A 10 receives the PDU session establishment reject message not including the 53rd identification information, the UE_A 10 may initiate a new PDU session establishment procedure using identification information indicating the same PDU session ID as that of the 33rd identification information, or may transmit a new PDU session establishment request message including the identification information indicating the same PDU session ID as that of the 33rd identification information. Further, in a case that the UE_A 10 receives the 54th identification information, the UE_A 10 may recognize that the PDU session establishment using the PDU session type and/or the address indicated by the 34th identification information is prohibited. Further, in a case that the UE_A 10 receives the 54th identification information, the UE_A 10 may be prohibited from initiating a new PDU session establishment procedure using the identification information indicating the same PDU session type and/or address as the PDU session type and/or address of the 34th identification information, or may be prohibited from transmitting a new PDU session establishment request message including the identification information indicating the same PDU session type and/or address as the PDU session type and/or address of the 34th identification information.

Further, in a case that the UE_A 10 receives the PDU session establishment reject message including the 54th identification information, the UE_A 10 need not initiate a new PDU session establishment procedure using the identification information indicating the same PDU session type and/or address as the PDU session type and/or address of the 34th identification information, or need not transmit a new PDU session establishment request message including the identification information indicating the same PDU session type and/or address as the PDU session type and/or address of the 34th identification information. In other words, in a case that the UE_A 10 receives the PDU session establishment reject message not including the 54th identification information, the UE_A 10 may initiate a new PDU session establishment procedure using identification information indicating the same PDU session type and/or address as the PDU session type and/or address of the 34th identification information, or may transmit a new PDU session establishment request message including the identification information indicating the same PDU session type and/or address as the PDU session type and/or address of the 34th identification information.

Further, in a case that the UE_A 10 receives the 55th identification information, the UE_A 10 may recognize that the PDU session establishment using the TFT indicated by the 35th identification information is prohibited. Further, in the case that the UE_A 10 receives the 55th identification information, the UE_A 10 may be prohibited from initiating a new PDU session establishment procedure using the identification information indicating the same TFT as that of the 35th identification information, or may be prohibited from transmitting a new PDU session establishment request message including the identification information indicating the same TFT as that of the 35th identification information.

Furthermore, in a case that the UE_A 10 receives the PDU session establishment reject message including the 55th identification information, the UE_A 10 need not initiate a new PDU session establishment procedure using the identification information indicating the same TFT as that of the 35th identification information, or need not transmit a new PDU session establishment request message including the identification information indicating the same TFT same as that of the 35th identification information. In other words, in a case that the UE_A 10 receives the PDU session establishment reject message not including the 55th identification information, the UE_A 10 may initiate a new PDU session establishment procedure using the identification information indicating the same TFT as that of the 35th identification information, or may transmit a new PDU session establishment request message including the identification information indicating the same TFT as that of the 35th identification information.

Further, in a case that the UE_A 10 receives the 51st identification information and/or the 56th identification information, the UE_A 10 may recognize that the PDU session establishment to connect to the second DN is temporarily prohibited. Further, in a case that the UE_A 10 receives the 51st identification information and/or the 56th identification information, the UE_A 10 may be temporarily prohibited from initiating a new PDU session establishment procedure performed to establish the PDU session to connect to the second DN, or may be temporarily prohibited from transmitting the PDU session establishment request message indicating the request for the PDU session establishment to connect to the second DN.

Furthermore, in a case that the UE_A 10 receives the 56th identification information, the UE_A 10 may configure the value indicated by the 56th identification information as the value of the first timer, or may start running the first timer. In addition, the UE_A 10 may be prohibited from initiating a new PDU session establishment procedure performed to establish the PDU session to connect to the second DN until the first timer expires, or may be prohibited from transmitting the PDU session establishment request message indicating the request for the PDU session establishment to connect to the second DN until the first timer expires.

Furthermore, in a case that the UE_A 10 receives the PDU session establishment reject message including one or more pieces of identification information among the 51st identification information to the 56th identification information, the UE_A 10 need not initiate a new PDU session establishment procedure performed to establish the PDU session to connect to the second DN, or need not transmit a new PDU session establishment request message indicating the request for the PDU session establishment to connect to the second DN. In other words, in a case that the UE_A 10 receives the PDU session establishment reject message not including one or more pieces of identification information among the 51st identification information to the 56th identification information, the UE_A 10 may initiate a new PDU session establishment procedure performed to establish the PDU session to connect to the second DN, or may transmit a new PDU session establishment request message indicating the request for the PDU session establishment to connect to the second DN.

Furthermore, in a case that the UE_A 10 receives one or more pieces of identification information among the 41st identification information to the 45th identification information, information indicated by each piece of the identification information received together with the PDU session establishment accept message may be stored in the context held by the UE_A 10. Furthermore, in a case that the UE_A 10 receives one or more pieces of identification information among the 51st identification information to the 56th identification information, the information in the context held by the UE_A 10 may be updated or deleted, or the information indicated by each piece of the identification information received together with the PDU session establishment reject message may be further stored in the context held by the UE_A 10.

In addition, the UE_A 10 may transition to the first state, may transition to a state in which the PDU session has been established, or may transition to a normal state, based on the reception of the PDU session establishment accept message and/or the reception of each piece of the identification information included in the PDU session establishment accept message. Note that the normal state may be a state to which the UE_A 10 transitions at the time of successful completion of the present procedure. Further, the normal state may be a state in which the PDU session requested by the UE_A 10 has been established. Note that the state to which the UE_A 10 transitions based on the completion of the present procedure is not limited to these states.

Further, the UE_A 10 may transition to a state in which the PDU session is not established, or may transition to an abnormal state based on the reception of the PDU session establishment reject message and/or the reception of each piece of the identification information included in the PDU session establishment reject message. Note that the abnormal state may be a state to which the UE_A 10 transitions at the time of abnormal completion of the present procedure. Furthermore, the abnormal state may be a state in which the PDU session requested by the UE_A 10 is not established. Note that the state to which the UE_A 10 transitions based on the completion of the present procedure is not limited to this.

In addition, based on the transmission of the PDU session establishment accept message and/or the transmission of each piece of identification information included in the PDU session establishment accept message, the AMF_A 240 and/or the SMF_A 230 may cause a state correlated to the UE_A 10 to transition to the first state, to transition to a state in which the PDU session has been established, or to transition to the normal state. Note that the state transitioned from the state correlated to the UE_A 10 based on the completion of the present procedure is not limited to these states.

In addition, based on the transmission of the PDU session establishment reject message and/or the transmission of each piece of identification information included in the PDU session establishment reject message, the AMF_A 240 and/or the SMF_A 230 may cause the state correlated to the UE_A 10 to transition to a state in which the PDU session is not established, or to transition to an abnormal state. Note that the state transitioned from the state correlated to the UE_A 10 based on the completion of the present procedure is not limited to these states.

The first condition determination may be performed based on the identification information included in the PDU session establishment request message, and/or the subscriber information, and/or the operator policy. For example, in a case that the network allows the request of the UE_A 10, the first condition determination may be true. In a case that the network does not allow the request of the UE_A 10, the first condition determination may be false. Furthermore, in a case that the network as the connection destination of the UE_A 10 and/or the apparatus in the network supports the function requested by the UE_A 10, the first condition determination may be true, and in a case that the function is not supported, the first condition determination may be false. Conditions for determining true or false of the first condition determination need not be limited to the above-described conditions.

The second condition determination may be performed based on whether the session on the N4 interface for the PDU session has been established. For example, in a case that the session on the N4 interface for the PDU session has been established, the second condition determination may be true, and in a case that the session on the N4 interface for the PDU session is not established, the second condition determination may be false. Conditions for determining true or false of the second condition determination need not be limited to the above-described conditions.

1.4. Description of Procedure Associated with UE Mobility

Next, in the registration procedure described above, there are four procedures, as follows, for establishing the PDU session to the DN_B 105 in a case that the UE_A 10 that has received the 62nd identification information in the registration procedure described above and is allowed to have connectivity to a certain LADN with the 62nd identification information moves to a specific location where the connection to the LADN is allowed. One procedure is a PDU session establishment procedure to detect that the UE_A 10 is present at the specific location by the UE_A 10 and establish the PDU session to the DN_B 105 (hereinafter also referred to as a second PDU session establishment procedure). In another procedure, the network (for example, the AMF_A 240) detects that the UE_A 10 is present at the specific location and the UE_A 10 is caused to perform the PDU session establishment procedure to establish the PDU session to the DN_B 105 (hereinafter also referred to as a third PDU session establishment procedure). Yet in another procedure, the network (for example, the AMF_A 240) detects that the UE_A 10 is present at the specific location and the UE_A 10 is caused to perform the registration procedure and the PDU session establishment procedure to establish the PDU session to the DN_B 105 (hereinafter also referred to as a fourth PDU session establishment procedure). In the last procedure, the network (for example, the AMF_A 240) detects that the UE_A 10 is present at the specific location and the PDU session establishment procedure is performed in a network-initiated manner to establish the PDU session to the DN_B 105 (hereinafter also referred to as a fifth PDU session establishment procedure).

1.4.1. Description of Second PDU Session Establishment Procedure

Next, the second PDU session establishment procedure will be described. The second PDU session establishment procedure may be basically the same processing flow as that of the first PDU session establishment procedure, except that the target DN to which the PDU session is to be established and the target entities with which signals are to be exchanged (that is, the SMF and the UPF) are different. In other words, the second PDU session establishment procedure is replacements of the DN_A 5 by the DN_B 105, the SMF_A 230 by the SMF_B 232, and the UPF_A 235 by the UPF_B 237 in the first PDU session establishment procedure; therefore, the following omits the detailed description. Each message and its content exchanged between the apparatuses and/or the NFS in the second PDU session establishment procedure may be the same as each message and its content exchanged between the apparatuses and/or the NFS in the first PDU session establishment procedure.

The second PDU session establishment procedure is completed by performing the processing flow described above. Then, based on the completion of the second PDU session establishment procedure, that is, in a case that the procedure of (A) in FIG. 10 is performed, the UE_A 10 can transition to the second state.

1.4.2. Description of Third PDU Session Establishment Procedure

Figure 11:
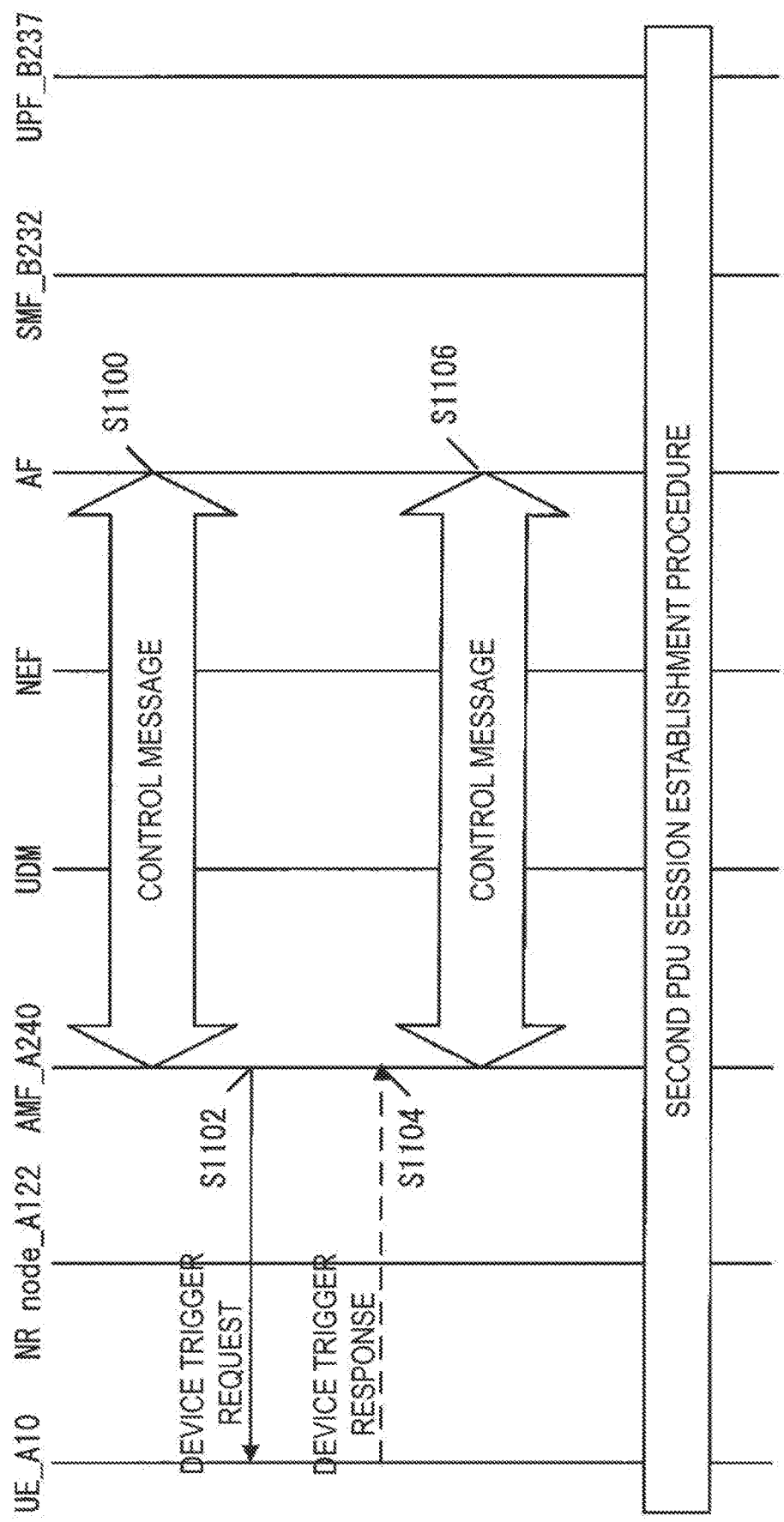
FIG. 11 is a diagram illustrating the PDU session establishment procedure triggered by a network.

Next, the following describes the third PDU session establishment procedure with reference to FIG. 11.

The third PDU session establishment procedure may be initiated by detecting the location of the UE_A 10 (the movement of the UE_A 10 to the specific location) by the network (for example, the AMF_A 240) side through performing the above-described registration procedure at the specific location after the UE_A 10 moves to the specific location.

Next, in a case that the AMF_A 240 detects the position of the UE_A 10, the AMF_A 240 exchanges the control message with the UDM, the NEF, the AF, and the like (S1100). The AF may be present in the DN_B 105. More specifically, the AMF_A 240 may notify the AF of the presence of the UE_A 10 at the specific location. The AF may transmit a Device Trigger Request message to the AMF_A 240 via the NEF. Note that the exchange of the control message with the UDM, the NEF, the AF, and the like by the AMF_A 240 may be performed after detecting the position of the UE_A 10.

Then, the AMF_A 240 transmits the Device Trigger Request message to the UE_A 10 as a NAS message (S1102). At this time, in a case that the UE_A 10 is not connected, the AMF_A 240 may perform Paging to the UE_A 10.

Next, in a case that the UE_A 10 receives the device trigger request message from the AMF_A 240, the UE_A 10 notifies to its application that the PDU session establishment is requested.

The UE_A 10 may transmit a Device Triggering Response message to the AMF_A 240. Through this transmission, the UE_A 10 may notify the reception of the device trigger request message (S1104). The AMF_A 240 may recognize that the UE_A 10 has accepted and/or the UE_A 10 has configured the content of the device trigger request message requested by the AMF_A 240 itself in a case that the AMF_A 240 receives the device triggering response message from the UE_A 10. The AMF_A 240 then exchanges the control message with the UDM, the NEF, the AF, and the like (S1106). More specifically, the AMF_A 240 may transmit the device triggering response message to the AF via the NEF to notify that the PDU session establishment has been requested to the UE_A 10. The AF may recognize it by receiving the device triggering response message from the AMF_A 240.

Next, the UE_A 10 can perform the same processing flow as that of the above-described second PDU session establishment procedure based on the reception of the device trigger request message from the AMF_A 240 and/or the transmission of the device triggering response message to the AMF_A 240. In this case, in other words, in a case that the procedure of (A) in FIG. 10 is performed, the UE_A 10 can establish the PDU session with the DN_B 105.

The third PDU session establishment procedure is completed through performing the above-described processing flow. Then, based on the completion of the third PDU session establishment procedure, the UE_A 10 can transition to the second state.

1.4.3. Description of Fourth PDU Session Establishment Procedure

Next, the fourth PDU session establishment procedure will be described. The fourth PDU session establishment procedure may be initiated by detecting the location of the UE_A 10 (the movement of the UE_A 10 to the specific location) by the network (for example, the AMF_A 240) side.

The fourth PDU session establishment procedure is initiated by transmitting the control message indicating the request for performing the above-described registration procedure from the AMF_A 240 to the UE_A 10.

In a case that the UE_A 10 accepts the request for performing the registration procedure requested by the control message, the UE_A 10 may transmit Acknowledgment (ACK) to indicate to the AMF_A 240 that the UE_A 10 accepts the request. Then, the UE_A 10 can perform the registration procedure. The registration procedure performed here is basically the same flow as the above-described registration procedure by replacing the SMF_A 230 with the SMF_B 232, and therefore the detailed descriptions thereof will be omitted. However, the AMF_A 240 may transmit the Registration Accept message including information indicating that the second PDU session establishment procedure is allowed to be performed. Then, the UE_A 10 that has received the registration accept message including this information can perform the second PDU session establishment procedure described above. In a case that the second PDU session establishment procedure described above is performed, the UE_A 10 can establish the PDU session with the DN_B 105.

Meanwhile, in a case that the UE_A 10 does not accept the request for performing the registration procedure requested by this control message, the UE_A 10 may transmit Negative Acknowledgment (NACK) to indicate to the AMF_A 240 that the UE_A 10 does not accept the request. In this case, the UE_A 10 does not perform the registration procedure described above.

The fourth PDU session establishment procedure is completed by performing the processing flow described above. Based on the completion of the fourth PDU session establishment procedure, that is, in a case that the procedure of (A) in FIG. 10 is performed, the UE_A 10 can establish the PDU session with the DN_B 105.

1.4.4. Description of Fifth PDU Session Establishment Procedure

Next, the fifth PDU session establishment procedure will be described. The fifth PDU session establishment procedure is one of PDU session establishment procedures to be performed in a network-initiated manner.

The fifth PDU session establishment procedure is a processing flow initiated from the SMF selection (S1002) in the second PDU session establishment procedure. In other words, the fifth PDU session establishment procedure may be a procedure in which the transmission of the PDU session establishment request message from the UE_A 10 (S1000) is absent in the processing flow illustrated in FIG. 10. This SMF selection (S1002) may be started by detecting the location of the UE_A 10 (the movement of the UE_A 10 to the specific location) by (for example, AMF_A 240) side. Except for the differences described above, since the fifth PDU session establishment procedure is the same as the second PDU session establishment procedure, the detailed description thereof will be omitted.

The fifth PDU session establishment procedure is completed by performing the processing flow described above. Based on the completion of the fifth PDU session establishment procedure, that is, in a case that the procedure of (A) in FIG. 10 is performed, the UE_A 10 can establish the PDU session with the DN_B 105.

1.4.5. Others

Note that, in the second to fifth PDU session establishment procedures, after receiving the PDU session establishment accept message from AMF_A 240, the UE_A 10 may transmit a RS (hereinafter also referred to as a second RS) to the core network to configure the IPv6 address and/or to obtain the IPv6 prefix, and/or to obtain the RA (hereinafter also referred to as a second RA). Here, the second RS transmitted from the UE_A 10 may be transmitted to the SMF_B 232 via the UPF_B 237. For example, in a case that the UPF_B 237 receives the second RS transmitted from the UE_A 10, the UPF_B 237 may select the SMF_B 232 associated with the PDU session among multiple SMFs connected to the UPF and transmit the second RS to the selected SMF_B 232. The SMF selection by the UPF may be performed using the PDU session ID transmitted from the UE or any of the NFS (including the SMF_B 232).

Then, the SMF_B 232 that has received the second RS generates the second RA in a case that the PDU Type of the UE_A 10 is the IPv6 and transmits the second RA to the UE_A 10 via the N4 interface and the UPF_B 237. At this time, the SMF_B 232 may transmit the second RA including the IPv6 prefix and/or the 64th identification information. The 64th identification information may be information transmitted only in a case of receiving the 63rd identification information.

Note that although the description has been given that the second RA is generated by SMF_B 232, but may be generated by the UPF_B 237. In this case, since the second RS transmitted from the UE_A 10 is not transmitted to the SMF_B 232 via the UPF_B 237, the UPF does not select the SMF. Specifically, in a case that the PDU Type of the UE_A 10 is IPv6, the UPF_B 237 that has received the second RS from the UE_A 10 generates the second RA and transmits the second RA to the UE_A 10 via the N3 interface.

Further, the second RS and the second RA may periodically interact while the PDU session is being established.

The UE_A 10 can select the UPF_B 237 as the default router to the DN_B 105 by receiving the second RA by any of the above-described methods and configuring the IPv6 address, and further can recognize the preference of the route to the DN_B 105.

In a case that the SMF_B 232 and the SMF_A 230 are identical (represented as the SMF_B 232 here), the SMF_B 232 can generate and transmit not only the second RA but also the first RA. That is, in a case that the SMF_B 232 receives the second RS transmitted from the UE_A 10, the SMF_B 232 may transmit a third RA including the first RA and the second RA described above to the UE_A 10 via the UPF_A 235 or the UPF_B 237. While the first RA and second RA are different RAs, they are included in the third RA and transmitted as a batch transmission, thus allowing resources to be reduced.

As described above, the UE_A 10 can recognize the preference of the route to DN_A 5 through the first PDU session establishment procedure, and can recognize the preference of the route to the DN_B 105 through any of the second to fifth PDU session establishment procedures.

The UE_A 10 compares the preference value of the route to the DN_A 5 with the preference value of the route to the DN_B 105.

At this time, only the PDU session to the DN having a higher preference value may be maintained and the PDU session to the DN having a lower preference may be released. That is, in a case that the value of the preference of the route to the DN_A 5 is higher, the PDU session to the DN_A 5 may be maintained and the PDU session to the DN_B 105 may be released. In this case, the UE_A 10 may transition to the first state. In a case that the value of the preference of the route to the DN_B 105 is higher, the PDU session to the DN_B 105 may be maintained and the PDU session to the DN_A 5 may be released. In this case, the UE_A 10 may transition to the third state.

Moreover, in a case that the value of preference of the route to the DN_A 5 and the value of preference of the route to the DN_B 105 are the same, the PDU session to the DN_B 105 may constantly be prioritized. That is, the UE_A 10 may maintain the PDU session to the DN_B 105, release the PDU session to the DN_A 5, and transition to the third state. Conversely, in a case that the value of preference of the route to the DN_A 5 and the value of preference of the route to the DN_B 105 are the same, the PDU session to the DN_A 5 may constantly be prioritized. That is, the UE_A 10 may maintain the PDU session to the DN_A 5, release PDU session to the DN_B 105, and transition to the first state.

1.5. Description of UE Configuration Update Procedure

Figure 12:
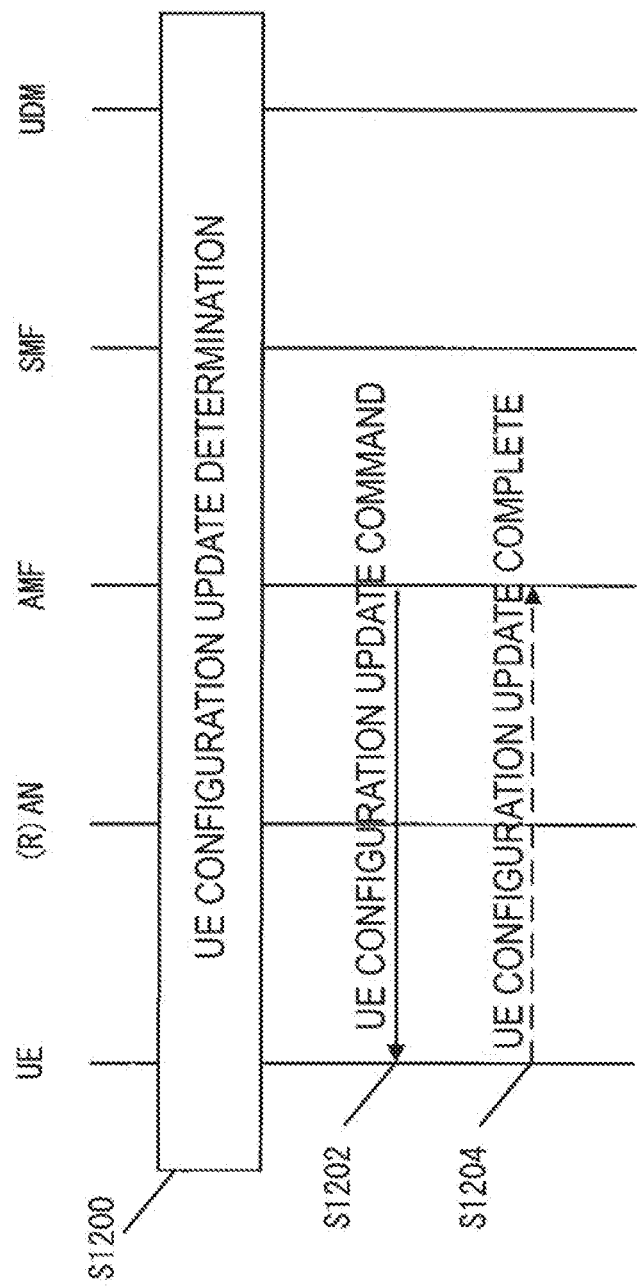
FIG. 12 is a diagram illustrating a UE configuration update procedure triggered by the network.
Figure 13:
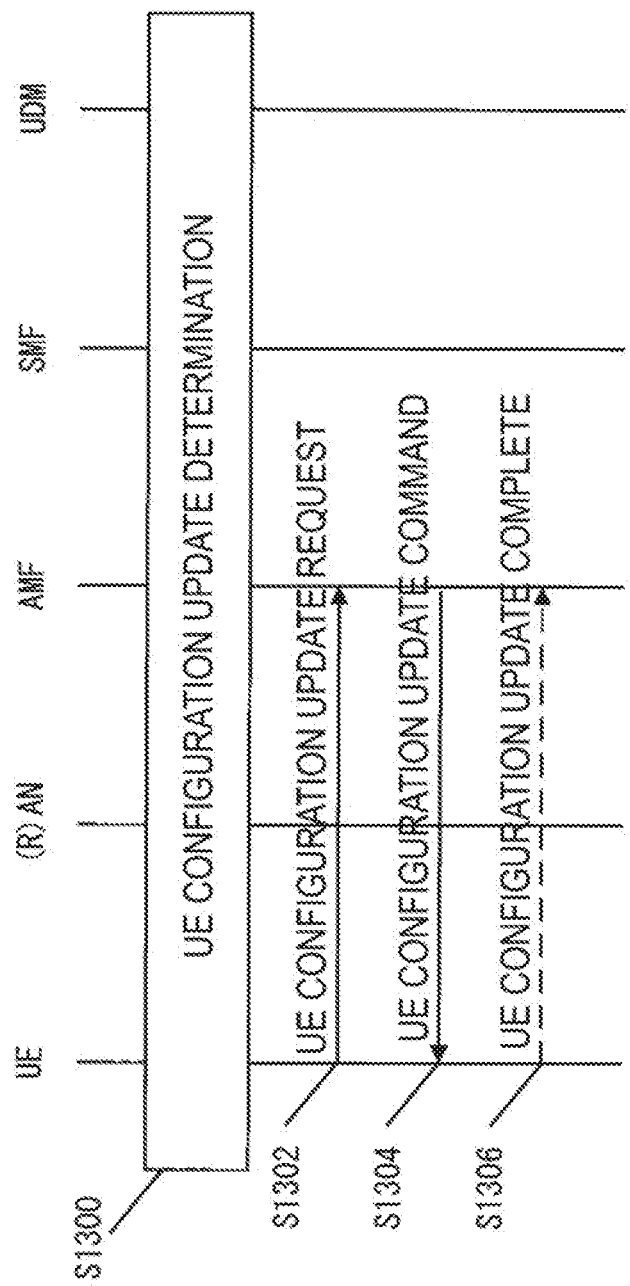
FIG. 13 is a diagram illustrating the UE configuration update procedure triggered by the UE.
Figure 14:
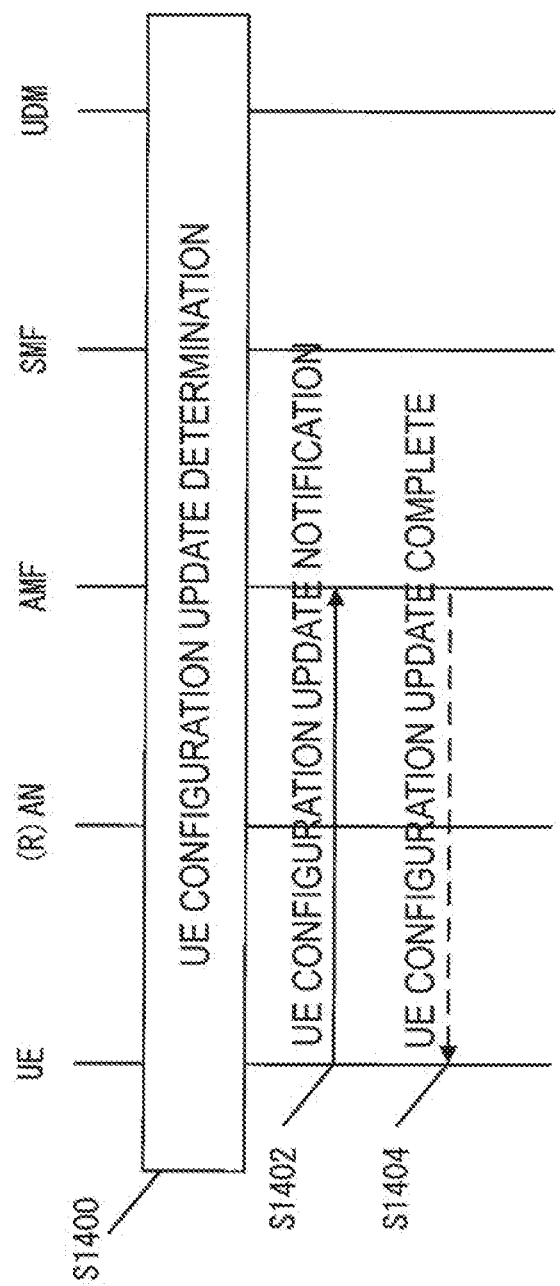
FIG. 14 is a diagram illustrating the UE configuration update procedure triggered by the UE.

Next, the following describes the UE Configuration Update procedure with reference to FIG. 12, FIG. 13, and FIG. 14. The UE configuration update procedure includes a Network initiated UE Configuration Update procedure and a UE initiated UE Configuration Update procedure. FIG. 12 illustrates one example of the former, and FIGS. 13 and 14 illustrate one example of the latter.

1.5.1. Network Initiated UE Configuration Update Procedure—Description of First UE Configuration Update Procedure First, the following describes the Network initiated UE configuration update procedure (also referred to as the first UE configuration update procedure) with reference to FIG. 12. The AMF_A 240 can initiate the procedure to change the configuration of the UE_A 10.

First, the AMF_A 240 confirms the configuration state of the UE_A 10 and determines whether the configuration of the UE_A 10 should be changed (S1200). For example, the AMF_A 240 determines that the configuration of the UE_A 10 should be changed in a case that the AMF_A 240 considers that the UE capability information to the UE_A 10 is to be changed, considers that connectivity to the LADN to the UE_A 10 is to be changed (that is, to be allowed or prohibited), and the like. Conversely, in a case that the AMF_A 240 considers that the UE capability information to the UE_A 10 need not to be changed, considers that the connectivity to the LADN to the UE_A 10 is not changed (that is, not allowed or not prohibited), and the like, the AMF_A 240 determines that the configuration of the UE_A 10 should not be changed and terminates the procedure.

In addition, the determination in S1200 may be performed based on a state change associated with the movement of the UE_A 10, the network side policies, a change in the registration content of the UE_A 10, and the like. Also, in a case that the UE_A 10 is in a CM-IDLE state, the AMF_A 240 may initiate a Network triggered Service Request procedure. In addition, in a case that the UE_A 10 is in a CM-CONNECTED state, the AMF_A 240 need not initiate the Network triggered Service Request procedure.

Next, the AMF_A 240 transmits a UE Configuration Update command including a parameter of the UE_A 10 to the UE_A 10 (S1202). Note that the parameter of the UE_A 10 may be configuration information of the UE_A 10 to be updated, and may be Mobility Restrictions, a Temporary User ID, a TAI list, UE NSSAI information, policy information, and the like. The parameter of the UE_A 10 may be information indicating that the connectivity to the LADN to the UE_A 10 is allowed, and information indicating that the connectivity to the LADN to the UE_A 10 is prohibited (not allowed). The AMF_A 240 may request for transmission of a response message to a command in the UE configuration update command or together with the UE configuration update command.

Next, in a case that the UE_A 10 receives the UE configuration update command from the AMF_A 240, the UE_A 10 may transmit a UE configuration update complete message to the AMF_A 240 (S1204). Here, only in a case that the UE_A 10 detects that the transmission of the response message to the UE configuration update command (that is, the UE configuration update complete message) is requested in the UE configuration update command, the UE_A 10 may transmit the UE configuration update complete message. The UE_A 10 may trigger a Registration Update procedure based on the information included in the UE configuration update command.

Then, in a case that the AMF_A 240 receives the UE configuration update complete message from the UE_A 10, the AMF_A 240 may recognize that the update of the UE_A 10 configuration has been completed.

Note that, in a case that, although the AMF_A 240 has requested for the transmission of the response message to the UE configuration update command in S1202, the AMF_A 240 cannot receive the UE configuration update complete message from the UE_A 10 in a predetermined period, the AMF_A 240 may recognize that the update of UE_A 10 configuration has failed and terminate the procedure. Alternatively, the AMF_A 240 may retransmit the UE configuration update command in S1202, rather than terminating the procedure. In this case, in a case that the AMF_A 240 receives the UE configuration update complete message from the UE_A 10, the AMF_A 240 does not perform the retransmission. Conversely, in a case that the AMF_A 240 cannot receive the UE configuration update complete message from the UE_A 10, the AMF_A 240 may further repeat the retransmission by a predetermined number of times.

The first UE configuration update procedure is then completed.

1.5.2. Description of UE Initiated UE Configuration Update Procedure—Second UE Configuration Update Procedure Next, the following describes the UE configuration update procedure initiated by the UE_A 10 (also referred to as the second UE configuration update procedure) with reference to FIG. 13. The UE_A 10 can start the procedure to change the configuration of itself.

First, the UE_A 10 confirms the configuration state of itself and determines whether the configuration of itself should be changed (S1300). For example, the UE_A 10 determines that the configuration of itself should be changed in a case that the UE_A 10 considers that the UE capability information of itself is to be changed, considers that the connectivity of itself to the LADN is to be changed (that is, to be allowed or prohibited), and the like. Conversely, in a case that the UE_A 10 considers that the UE capability information of itself need not to be changed, considers that the connectivity of itself to the LADN need not to be changed (that is, not to be allowed or not to be prohibited), and the like, the UE_A 10 determines that the configuration of itself should not be changed and terminates the procedure.

In a case that the UE_A 10 is in a CM-IDLE state, the UE_A 10 may initiate a UE triggered Service Request procedure. In a case that the UE_A 10 is in a CM-CONNECTED state, the UE_A 10 need not initiate the UE triggered Service Request procedure.

Next, the UE_A 10 transmits a UE Configuration Update Request message to the AMF_A 240 (S1302) to request the core network (AMF_A 240) to change the configuration of itself. Here, in order to connect to the LADN (second DN), the UE_A 10 may include information indicating a request for connection to the LADN (the second DN) and/or information indicating that the connection to the usual DN (first DN) is not requested in a UE configuration update request message to notify it. Additionally, in order to connect to the usual DN (the first DN), the UE_A 10 may include information indicating that the connection to the LADN (the second DN) is not requested and/or information indicating a request for connection to the normal LADN (the first DN) in the UE configuration update request message to notify it.

Next, the AMF_A 240 receives the UE configuration update request message from the UE_A 10. For example, in a case that the UE configuration update request message includes the information indicating the request for connection to the LADN and/or the information indicating that the connection to the usual DN (the first DN) is not requested, and in a case that the AMF_A 240 allows the connection to the LADN (the second DN), the AMF_A 240 may notify the UE_A 10 of it by transmitting a UE configuration update command including the information indicating that the connectivity to the LADN is allowed and/or the information indicating that the connectivity to the usual DN (the first DN) is not allowed. In a case that the UE configuration update request message includes the information indicating that the connection to the LADN is not requested and/or the information indicating the request for connection to the usual DN (the first DN), and in a case that the AMF_A 240 allows the connection to the usual DN (the first DN), the AMF_A 240 may notify the UE_A 10 of it by transmitting the UE configuration update command including the information indicating that the connectivity to the LADN is not allowed and/or the information indicating that the connectivity to the usual DN (the first DN) is allowed (S1304).

Additionally, in a case that the AMF_A 240 transmits the UE configuration update command, the AMF_A 240 may include and transmit the parameter of the UE_A 10. Note that the parameter of the UE_A 10 may be configuration information of the UE_A 10 to be updated, and may be Mobility Restrictions, a Temporary User ID, a TAI list, UE NSSAI information, policy information, and the like. The AMF_A 240 may request for transmission of a response message to a command in the UE configuration update command or together with the UE configuration update command.

Additionally, in a case that the AMF_A 240 rejects the UE configuration update request message, the AMF_A 240 may transmit a UE Configuration Update Failure command including information indicating it to the UE_A 10, or may transmit another control message to notify it. Specifically, in a case that the UE configuration update request message includes the information indicating the request for connection to the LADN and/or the information indicating that the connection to the usual DN (the first DN) is not requested, and in a case that the AMF_A 240 does not allow the connection to the LADN (the second DN), the AMF_A 240 may notify the UE_A 10 of it by transmitting the UE configuration update command including the information indicating that the connectivity to the LADN is not allowed. In a case that the UE configuration update request message includes the information indicating that the connection to the LADN is not requested and/or the information indicating the request for connection to the usual DN (the first DN), and in a case that the AMF_A 240 does not allow the connection to the usual DN (the first DN), the AMF_A 240 may notify the UE_A 10 of it by transmitting the UE configuration update command including the information indicating that the connectivity to the usual DN (the first DN) is not allowed (S1304).

Next, in a case that the UE_A 10 receives the UE configuration update command from the AMF_A 240 and detects that the request of itself has been allowed, the UE_A 10 may transmit the UE configuration update complete message to the AMF_A 240 (S1306). Here, only in a case that the UE_A 10 detects that the transmission of the response message to the UE configuration update command (that is, the UE configuration update complete message) is requested in the UE configuration update command, the UE_A 10 may transmit the UE configuration update complete message. The UE_A 10 may trigger the Registration Update procedure based on the information included in the UE configuration update command.

In a case that the UE_A 10 detects that the request of itself has not been allowed based on the information included in the UE configuration update command and the UE configuration update failure command received from the AMF_A 240, the UE_A 10 may terminate the procedure. After a predetermined period of time has elapsed, the procedure may be performed again.

Next, in a case that the AMF_A 240 receives the UE configuration update complete message from the UE_A 10, the AMF_A 240 may recognize that the configuration update of the UE_A 10 has been completed.

Note that, in a case that, although the AMF_A 240 has requested for the transmission of the response message to the UE configuration update command in S1304, the AMF_A 240 cannot receive the UE configuration update complete message from the UE_A 10 in the predetermined period, the AMF_A 240 may recognize that the UE_A 10 configuration update has failed and terminate the procedure. Alternatively, the AMF_A 240 may retransmit the UE configuration update command in S1304, rather than terminate the procedure. In this case, in a case that the AMF_A 240 receives the UE configuration update complete message from the UE_A 10, the AMF_A 240 does not perform the retransmission. Conversely, in a case that the AMF_A 240 cannot receive the UE configuration update complete message from the UE_A 10, the AMF_A 240 may further repeat the retransmission by the predetermined number of times.

The second UE configuration update procedure is then completed.

1.5.3. Description of UE Initiated UE Configuration Update Procedure—Third UE Configuration Update Procedure Next, the following describes the UE configuration update procedure initiated by the UE_A 10 (also referred to as the third UE configuration update procedure) with reference to FIG. 14. The UE_A 10 can initiate the procedure to change the configuration of itself.

First, the UE_A 10 confirms the configuration state of itself and determines whether the configuration of itself should be changed (S1400). For example, the UE_A 10 determines that the configuration of itself should be changed in a case that the UE_A 10 considers that the UE capability information of itself is to be changed, considers that the connectivity of itself to the LADN is to be changed (that is, to be allowed or prohibited), and the like. Conversely, in a case that the UE_A 10 considers that the UE capability information of itself need not to be changed, considers that the connectivity of itself to the LADN need not to be changed (that is, not to be allowed or not to be prohibited), and the like, the UE_A 10 determines that the configuration of itself should not be changed and terminates the procedure.

In a case that the UE_A 10 is in a CM-IDLE state, the UE_A 10 may initiate a UE triggered Service Request procedure. In a case that the UE_A 10 is in a CM-CONNECTED state, the UE_A 10 need not initiate the UE triggered Service Request procedure.

Next, the UE_A 10 transmits a UE Configuration Update Notification message to the AMF_A 240 (S1402) to notify the core network (AMF_A 240) of changing its configuration. Here, in order to connect to the LADN (second DN), the UE_A 10 may include information indicating the connection to the LADN (the second DN) and/or information indicating that the UE_A 10 does not connect to the usual DN (first DN) in the UE configuration update notification message to notify it. In order to connect to the usual DN (the first DN), the UE_A 10 may include information indicating that the UE_A 10 does not connect to the LADN (the second DN) and/or information indicating the connection to the usual DN (the first DN) in the UE configuration update notification message to notify it.

Next, in a case that the AMF_A 240 receives the UE configuration update notification message from UE_A 10, the AMF_A 240 allows the request and configures the UE_A 10. The AMF_A 240 may transmit a UE configuration update configuration message to the UE_A 10 to notify UE_A 10 of the completion of the configuration (S1404).

In a case that the UE_A 10 receives the UE configuration update configuration message from the AMF_A 240, the UE_A 10 recognizes that the configuration of itself has been completed in the AMF_A 240.

The third UE configuration update procedure is then completed.

Through any of the UE configuration update procedures described above, the configuration regarding the connectivity to the LADN in the UE_A 10 is changed. Especially, in a case that the first UE configuration update procedure or the second UE configuration update procedure is performed, the UE_A 10 can change the configuration regarding the connectivity to the LADN based on the content notified by the UE configuration update command. In a case that the third UE configuration update procedure is performed, the UE can change the configuration regarding the connectivity to the LADN based on the content notified by the UE configuration update notification message. Then, in a case that the UE_A 10 transmits the registration request message in the registration update procedure to be performed after that, the UE_A 10 may determine whether to include the 61st identification information based on whether the connection to the LADN is allowed for itself. In other words, in a case that the connectivity to the LADN is allowed, the UE_A 10 can transmit the registration request message including the 61st identification information. However, in a case that the connectivity to the LADN is not allowed, the UE_A 10 cannot transmit the registration request message including the 61st identification information (can transmit only the registration request message not including the 61st identification information).

2. Modifications

A program running on an apparatus according to the present invention may serve as a program that controls a Central Processing Unit (CPU) and the like to cause a computer to operate in such a manner as to realize the functions of the above-described embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such functions of the embodiment according to the present invention may be recorded on a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The above-mentioned electric circuit may include a digital circuit, or may include an analog circuit. Furthermore, in a case that with advances in semiconductor technology, a circuit integration technology that replaces the present integrated circuits appears, it is also possible to use a new integrated circuit based on the technology according to one or more aspects of the present invention.

Note that the invention of the present application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention.

Furthermore, a configuration in which constituent elements, described in the respective embodiments and having mutually the same effects, are substituted for one another is also included in the technical scope of the present invention.

REFERENCE SIGNS LIST

1 Mobile communication system
5 DN_A
10 UE_A
45 eNB_A
80 E-UTRAN_A
105 DN_B
120 5G-RAN_A
122 NR node_A
125 WLAN ANc
126 WAG_A
190 Core network_B
230 SMF_A
232 SMF_B
235 UPF_A
237 UPF_B
240 AMF_A

The invention claimed is:

1. A User Equipment (UE) comprising:
a controller configured to initiate a Registration procedure; and
transmission and/or reception circuitry configured to transmit, to an Access and Mobility Management Function (AMF), a Registration Request message including a first Local Area Data Network (LADN) Data Network Name (DNN) or an information of requesting LADN information, in the Registration procedure,
wherein
the transmission and/or reception circuitry is further configured to receive, from the AMF, a Registration Accept message including an LADN information including a second LADN DNN and an LADN service area information, in the Registration procedure,
wherein
the LADN is a Data Network (DN) that is accessible by the UE only in specific locations, that provides connectivity to a specific DNN, and
the second LADN DNN is a DNN which is determined based on the first LADN DNN and subscription data.

2. The UE according to claim 1, wherein
the second LADN DNN is a DNN which is determined based on the information transmitted included in the Registration Request message.

3. A communication method performed by a User Equipment (UE), the communication method comprising:
initiating a Registration procedure;
transmitting, to an Access and Mobility Management Function (AMF), a Registration Request message including a first Local Area Data Network (LADN) Data Network Name (DNN) or an information of requesting LADN Information, in the Registration procedure; and
receiving, from the AMF, a Registration Accept message including an LADN information including a second LADN DNN and an LADN service area information, in the Registration procedure,
wherein
the LADN is a Data Network (DN) that is accessible by the UE only in specific locations, that provides connectivity to a specific DNN, and
the second LADN DNN is a DNN which is determined based on the first LADN DNN and subscription data.

4. The communication method according to claim 3, wherein
the second LADN DNN is a DNN which is determined based on the information transmitted included in the Registration Request message.

5. An Access and Mobility Management Function (AMF) comprising:
a controller configured to perform a Registration procedure; and transmission and/or reception circuitry configured to receive, from a User Equipment (UE), a Registration Request message including a first Local Area Data Network (LADN) Data Network Name (DNN) or an information of requesting LADN Information, in the Registration procedure, wherein the transmission and/or reception circuitry is further configured to transmit, to the UE, a Registration Accept message including an LADN information including a second LADN DNN and an LADN service area information, in the Registration procedure, wherein the LADN is a Data Network (DN) that is accessible by the UE only in specific locations, that provides connectivity to a specific DNN, and the second LADN DNN is a DNN which is determined based on the first LADN DNN and subscription data.

6. The AMF according to claim 5, wherein the second LADN DNN is a DNN which is determined based on the information received included in the Registration Request message.

7. A communication method performed by an Access and Mobility Management Function (AMF), the communication method comprising:

performing a Registration procedure;

receiving, from a User Equipment (UE), a Registration Request message including a first Local Area Data Network (LADN) Data Network Name (DNN) or an information of requesting LADN Information, in the Registration procedure; and transmitting, to the UE, a Registration Accept message including an LADN information including a second LADN DNN and an LADN service area information, in the Registration procedure, wherein the LADN is a Data Network (DN) that is accessible by the UE only in specific locations, that provides connectivity to a specific DNN, and the second LADN DNN is a DNN which is determined based on the first LADN DNN and subscription data.

8. The communication method according to claim 7, wherein the second LADN DNN is a DNN which is determined based on the information received included in the Registration Request message.

* * * * *